United States Patent
Okamatsu

(10) Patent No.: US 7,759,412 B2
(45) Date of Patent: Jul. 20, 2010

(54) TIRE PUNCTURE SEALANT

(75) Inventor: Takahiro Okamatsu, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 425 days.

(21) Appl. No.: 11/679,561

(22) Filed: Feb. 27, 2007

(65) Prior Publication Data

US 2007/0203260 A1    Aug. 30, 2007

(30) Foreign Application Priority Data

| Feb. 27, 2006 | (JP) | ............................. 2006-049710 |
| Feb. 27, 2006 | (JP) | ............................. 2006-049711 |
| Feb. 27, 2006 | (JP) | ............................. 2006-050128 |
| Feb. 27, 2006 | (JP) | ............................. 2006-050129 |
| Feb. 27, 2006 | (JP) | ............................. 2006-050166 |

(51) Int. Cl.
- *B29C 73/00* (2006.01)
- *C08G 61/00* (2006.01)
- *C08J 9/14* (2006.01)
- *C08K 5/06* (2006.01)

(52) U.S. Cl. ........................ 523/166; 528/397; 528/451; 524/462; 524/378; 524/386; 524/388; 524/270; 521/98

(58) Field of Classification Search ................. 523/166; 524/270

See application file for complete search history.

(56) References Cited

U.S. PATENT DOCUMENTS

| 3,952,787 | A | * | 4/1976 | Okado et al. ................. 152/504 |
| 4,051,884 | A | * | 10/1977 | Bourne et al. ............... 152/509 |
| 4,101,494 | A | * | 7/1978 | Kent et al. .................. 523/166 |
| 4,213,491 | A | * | 7/1980 | Pope et al. .................. 152/504 |
| 4,294,730 | A | * | 10/1981 | Kenney ....................... 524/13 |
| 4,337,322 | A | * | 6/1982 | Jaspon ....................... 523/166 |
| 4,424,295 | A | * | 1/1984 | Van Ornum et al. ......... 524/526 |
| 4,501,825 | A | * | 2/1985 | Magyar et al. ............... 521/78 |
| 4,548,687 | A | * | 10/1985 | Kitamura et al. ............. 522/83 |
| 4,588,758 | A | * | 5/1986 | Jaspon ....................... 523/166 |
| 4,665,963 | A | * | 5/1987 | Timar et al. ................. 152/504 |
| 5,124,395 | A | * | 6/1992 | Abramowski et al. ....... 524/462 |
| 5,284,895 | A | * | 2/1994 | Gupta ....................... 524/378 |
| 5,338,776 | A | * | 8/1994 | Peelor et al. ................ 523/166 |
| 5,618,912 | A | * | 4/1997 | Fang .......................... 528/397 |
| 5,705,604 | A | * | 1/1998 | Fang .......................... 528/397 |
| 5,856,376 | A | * | 1/1999 | Wong ......................... 523/166 |
| 6,063,837 | A | * | 5/2000 | Kawamura et al. .......... 523/166 |
| 6,176,285 | B1 | * | 1/2001 | Gerresheim et al. ......... 152/509 |
| 6,194,485 | B1 | * | 2/2001 | Hogan et al. ................ 523/166 |
| 6,492,436 | B2 | * | 12/2002 | Howe et al. ................. 523/166 |
| 6,889,723 | B2 | | 5/2005 | Gerresheim et al. |
| 6,992,119 | B2 | | 1/2006 | Kojima et al. |
| 2002/0049260 | A1 | * | 4/2002 | Howe et al. .................. 521/98 |
| 2002/0112777 | A1 | | 8/2002 | Fang et al. |
| 2002/0121331 | A1 | * | 9/2002 | Gerresheim et al. ......... 156/115 |
| 2003/0050365 | A1 | * | 3/2003 | Kishida et al. .............. 523/166 |
| 2003/0136490 | A1 | * | 7/2003 | Koziatek ..................... 152/514 |
| 2004/0048962 | A1 | * | 3/2004 | Kojima et al. ............... 524/386 |
| 2004/0253452 | A1 | | 12/2004 | Ogino |
| 2005/0277712 | A1 | * | 12/2005 | Daly ............................ 524/17 |
| 2006/0142420 | A1 | * | 6/2006 | Nakazawa et al. .......... 523/166 |

FOREIGN PATENT DOCUMENTS

| EP | 1 693 431 A1 | 8/2006 |
| JP | 51-22681 A | 7/1976 |
| JP | 53-140704 A | 12/1978 |
| JP | 63-033518 A | 7/1988 |
| JP | 2000-272022 A | 10/2000 |
| JP | 2001-62934 A | 3/2001 |
| JP | 3210863 B2 | 7/2001 |
| JP | 2002-292758 A | 10/2002 |
| JP | 2004-35867 A | 2/2004 |
| JP | 2004-344860 A | 12/2004 |
| JP | 2005-170973 A | 6/2005 |
| JP | 2005-336353 A | 12/2005 |
| WO | WO-2004/048493 A1 | 6/2004 |

\* cited by examiner

*Primary Examiner*—Marc S Zimmer
*Assistant Examiner*—Noah Frank
(74) *Attorney, Agent, or Firm*—Connolly Bove Lodge & Hutz LLP

(57) ABSTRACT

A tire puncture sealant including a urethane emulsion, an acrylic emulsion or a polyolefin emulsion, and an antifreezing agent has a comparatively low viscosity and an excellent storage stability while showing sealing properties equivalent to those of a conventional tire puncture sealant. A tire puncture sealant including a synthetic resin emulsion and an antifreezing agent, and having a hydrogen ion exponent of 5.5 to 8.5 has a less pungent odor and hardly causes corrosion of steel cord. A tire puncture sealant including a chloroprene emulsion and an antifreezing agent and having a hydrogen ion exponent of less than 9.0 has a comparatively low viscosity and a less odor while showing sealing properties equivalent to those of a conventional tire puncture sealant.

7 Claims, No Drawings

TIRE PUNCTURE SEALANT

CROSS-REFERENCE TO RELATED APPLICATIONS

This application claims priority from Japanese Applications 2006-050129, filed Feb. 27, 2006, 2006-049711 filed Feb. 27, 2006, 2006-050166 filed Feb. 27, 2006, 2006-049710 filed Feb. 27, 2006, 2006-050128, filed Feb. 27, 2006 disclosures of which are incorporated herein by reference.

The entire contents of documents cited in this specification are incorporated herein by reference.

BACKGROUND OF THE INVENTION

The present invention relates to a tire puncture sealant.

Conventionally, a tire puncture sealant for repairing a punctured tire, which is prepared by blending natural rubber latex with an emulsion of a tackifier resin and an antifreezing agent, has been widely used (see, for example, JP 2004-035867 A and JP 3210863 B).

The tire puncture sealant is in the form of a latex in which natural rubber particles and tackifier resin particles repel each other by ionic repulsion, and dispersed and suspended in an aqueous solution of the antifreezing agent.

An example of the tire puncture sealant of this type is one including a latex of natural rubber, an emulsion of a tackifier resin, and an antifreezing agent, in which the tackifier resin of the tackifier resin emulsion is an aromatic modified terpene resin, and with respect to a total A+B+C of a solid content A of the natural rubber latex, a solid content B of the tackifier resin emulsion, and a content C of the antifreezing agent which is 100 parts by weight, the solid content A of the natural rubber latex is in a range of from 30 to 60 parts by weight, the solid content B of the tackifier resin emulsion is in a range of from 10 to 30 parts by weight, and the content C of the antifreezing agent is in a range of from 20 to 50 parts by weight (see JP 2004-035867 A).

Tire puncture sealants using synthetic rubber latexes such as acrylonitrile-butadiene rubber (NBR) latex and styrene-butadiene rubber (SBR) latex, have also been proposed (see JP 2005-170973 A and JP 2001-62934 A).

In general, such tire puncture sealant is injected into a tire through an air-charging portion of the tire and air is charged to a predetermined tire pressure, after which the car is driven to travel to allow the tire puncture sealant to reach a puncture; and the compression and shearing forces the tire receives when it rotates and touches the ground cause rubber particles to agglomerate to seal the puncture.

Recently used tires may puncture usually once every several years, so the frequency of actual use of the sealant is extremely low. Therefore, it is important for a tire puncture sealant to have sufficient performance to allow the long-term storage inside a car as well as excellent sealing properties.

SUMMARY OF THE INVENTION

However, the natural rubber latex-based tire puncture sealants as described in JP 2004-035867 A and JP 3210863 B show poor storage stability. More specifically, the tire puncture sealant has a service life of about one year when left to stand in a trunk of a car. When the service life is exceeded, the tire puncture sealant may solidify or gelate to significantly reduce its fluidity, thus leading to inability of the sealant to be injected into a punctured tire.

The natural rubber latex-based tire puncture sealant generally uses ammonia for stabilizing the natural rubber latex and therefore has a pungent odor. Further, the tire puncture sealant is adjusted to a pH of about 9.0 to 12.0, so steel cord in the tire may be rusted and corroded, and the tire puncture sealant may cause inflammation on the skin of a person when he/she touches it.

On the other hand, JP 2004-035867 A describes that it is possible to prevent the natural rubber latex from becoming putrid with less ammonia by using a so-called deproteinized natural rubber latex. However, even when the deproteinized natural rubber latex is used, the problems of odor and corrosion of steel cord still remain and a complicated production process such as deproteinization treatment is required.

The tire puncture sealant based on the NBR latex as described in JP 2005-170973 A is excellent in storage stability. However, because of its comparatively high viscosity, the tire puncture sealant may apply loads to a pump when injected into a tire, or the tire puncture sealant that remains in a nozzle after its injection may cure to cause clogging of the nozzle. When the temperature is extremely low, for example, at midwinter or during the snow fall, the viscosity of the sealant is increased to readily cause the above-mentioned problems when the sealant is injected into the tire. In general, ammonia is used to adjust the sealant to a pH of about 9.0 to 11.0 to thereby stabilize the NBR latex. Therefore, as in the case of the natural rubber latex-based tire puncture sealant, the NBR latex-based tire puncture sealant may suffer from such problems as generation of pungent odor, corrosion of steel cord, and inflammation of skin when the skin touches the sealant.

The SBR latex-based tire puncture sealant is also adjusted to a pH of about 9.0 to 11.0 with ammonia for its stabilization, and therefore suffers from the same problems as with the NBR latex-based tire puncture sealant.

Therefore, a first object of the present invention is to provide a tire puncture sealant that has a comparatively low viscosity and an excellent storage stability while showing sealing properties equivalent to those of a conventional tire puncture sealant.

A second object of the present invention is to provide a tire puncture sealant that has no pungent odor and hardly causes corrosion of steel cord, in addition to the effects achieved by the first object.

A third object of the present invention is to provide a tire puncture sealant that has a less pungent odor and hardly causes corrosion of steel cord.

A fourth object of the present invention is to provide a tire puncture sealant that has a comparatively low viscosity and an excellent storage stability while showing sealing properties equivalent to those of a conventional tire puncture sealant, in addition to the effects achieved by the third object.

A fifth object of the present invention is to provide a tire puncture sealant that has a comparatively low viscosity and a less odor, while showing sealing properties equivalent to those of a conventional tire puncture sealant.

A sixth object of the present invention is to provide a tire puncture sealant that is also excellent in storage stability, in addition to the effects achieved by the fifth object.

As a result of intensive studies for achieving the first object, the present inventor has found that a tire puncture sealant which includes a urethane emulsion, an acrylic emulsion or a polyolefin emulsion, and an antifreezing agent has a comparatively low viscosity and an excellent storage stability while showing sealing properties equivalent to those of a conventional tire puncture sealant.

As a result of intensive studies for achieving the second object, the present inventor has also found that a tire puncture sealant which has a hydrogen ion exponent (pH) of 5.5 to 8.5 has no pungent odor and hardly causes corrosion of steel cord.

As a result of intensive studies for achieving the third object, the present inventor has also found that a tire puncture sealant which includes a synthetic resin emulsion and an antifreezing agent, and has a hydrogen ion exponent of 5.5 to 8.5 has a less pungent odor and hardly causes corrosion of steel cord.

As a result of intensive studies for achieving the fourth object, the present inventor has also found that a tire puncture sealant has a comparatively low viscosity and an excellent storage stability while showing sealing properties equivalent to those of a conventional tire puncture sealant, when the above-mentioned synthetic resin emulsion is at least one emulsion selected from the group consisting of a urethane emulsion, an acrylic emulsion, a polyolefin emulsion, an ethylene-vinyl acetate emulsion, a vinyl acetate emulsion, and a polyvinyl chloride emulsion.

As a result of intensive studies for achieving the fifth object, the present inventor has also found that a tire puncture sealant which includes a chloroprene emulsion and an antifreezing agent and has a hydrogen ion exponent of less than 9.0 has a comparatively low viscosity and a less odor while showing sealing properties equivalent to those of a conventional tire puncture sealant.

As a result of intensive studies for achieving the sixth object, the present inventor has also found that a tire puncture sealant which has a hydrogen ion exponent of 7.5 or more also has an excellent storage stability.

The present inventor has completed the present invention on the basis of such findings.

In other words, the present invention provides the following (1) to (41).

(1) A tire puncture sealant including a urethane emulsion and an antifreezing agent.

(2) The tire puncture sealant according to (1) above, in which the urethane emulsion is obtained by reacting an ionizable group-containing urethane prepolymer with a neutralizing agent or a quaternizing agent in water.

(3) The tire puncture sealant according to (2) above, in which the urethane prepolymer is obtained by copolymerizing a polyisocyanate compound (A) having two or more isocyanate groups, a compound (B) having two or more active hydrogen atoms, and a compound (C) having a group reactive to isocyanate group and an ionizable group.

(4) The tire puncture sealant according to (2) or (3) above, in which the ionizable group is an anionic group.

(5) The tire puncture sealant according to (3) or (4) above, in which the compound (B) is a polyol compound.

(6) The tire puncture sealant according to (5) above, in which the polyol compound is at least one selected from the group consisting of polyether polyol, polycaprolactone polyol, polycarbonate polyol, and polyester polyol.

(7) The tire puncture sealant according to any one of (1) to (6) above, in which a content of the antifreezing agent is 100 to 500 parts by weight with respect to 100 parts by weight of a solid content of the urethane emulsion.

(8) The tire puncture sealant according to any one of (1) to (7) above, further including a tackifier.

(9) The tire puncture sealant according to (8) above, in which the tackifier is in the form of an emulsion obtained by emulsifying a resin.

(10) The tire puncture sealant according to (8) or (9) above, in which the tackifier contains at least one selected from the group consisting of a rosin resin, a terpene resin, and a hydrogenated terpene resin.

(11) The tire puncture sealant according to any one of (8) to (10) above, in which a solid content of the tackifier is 50 to 200 parts by weight with respect to 100 parts by weight of the solid content of the urethane emulsion.

(12) A tire puncture sealant including an acrylic emulsion and an antifreezing agent.

(13) The tire puncture sealant according to (12) above, in which a content of the antifreezing agent is 100 to 500 parts by weight with respect to 100 parts by weight of a solid content of the acrylic emulsion.

(14) The tire puncture sealant according to (12) or (13) above, further including a tackifier.

(15) The tire puncture sealant according to (14) above, in which the tackifier is in the form of an emulsion obtained by emulsifying a resin.

(16) The tire puncture sealant according to (14) or (15) above, in which the tackifier contains at least one selected from the group consisting of a rosin resin, a terpene resin, and a hydrogenated terpene resin.

(17) The tire puncture sealant according to any one of (14) to (16) above, in which a solid content of the tackifier is 50 to 200 parts by weight with respect to 100 parts by weight of the solid content of the acrylic emulsion.

(18) A tire puncture sealant including a polyolefin emulsion and an antifreezing agent.

(19) The tire puncture sealant according to (18) above, in which the polyolefin emulsion is at least one emulsion selected from the group consisting of polyethylene emulsion, polypropylene emulsion, ethylene-propylene copolymer emulsion, and polybutene emulsion.

(20) The tire puncture sealant according to (18) or (19) above, in which a content of the antifreezing agent is 90 to 500 parts by weight with respect to 100 parts by weight of a solid content of the polyolefin emulsion.

(21) The tire puncture sealant according to any one of (18) to (20) above, further including a tackifier.

(22) The tire puncture sealant according to (21) above, in which the tackifier is in the form of an emulsion obtained by emulsifying a resin.

(23) The tire puncture sealant according to (21) or (22) above, in which the tackifier contains at least one selected from the group consisting of a rosin resin, a terpene resin, and a hydrogenated terpene resin.

(24) The tire puncture sealant according to any one of (21) to (23) above, in which a solid content of the tackifier is 50 to 250 parts by weight with respect to 100 parts by weight of the solid content of the polyolefin emulsion.

(25) The tire puncture sealant according to any one of (1) to (24) above, in which the tire puncture sealant has a hydrogen ion exponent of 5.5 to 8.5.

(26) A tire puncture sealant which includes a synthetic resin emulsion and an antifreezing agent and has a hydrogen ion exponent of 5.5 to 8.5.

(27) The tire puncture sealant according to (26) above, in which the synthetic resin emulsion is at least one emulsion selected from the group consisting of a urethane emulsion, an acrylic emulsion, a polyolefin emulsion, an ethylene-vinyl acetate emulsion, a vinyl acetate emulsion, and a polyvinyl chloride emulsion.

(28) The tire puncture sealant according to (26) or (27) above, in which a content of the antifreezing agent is 100 to 500 parts by weight with respect to 100 parts by weight of a solid content of the synthetic resin emulsion.

(29) The tire puncture sealant according to any one of (26) to (28) above, further including a tackifier.

(30) The tire puncture sealant according to (29) above, in which the tackifier is in the form of an emulsion obtained by emulsifying a resin.

(31) The tire puncture sealant according to (29) or (30) above, in which the tackifier contains at least one selected from the group consisting of a rosin resin, a terpene resin, and a hydrogenated terpene resin.

(32) The tire puncture sealant according to any one of (29) to (31) above, in which a solid content of the tackifier is 50 to 200 parts by weight with respect to 100 parts by weight of the solid content of the synthetic resin emulsion.

(33) The tire puncture sealant according to any one of (26) to (32) above, in which the hydrogen ion exponent is 6.0 to 8.0.

(34) A tire puncture sealant which includes a chloroprene emulsion and an antifreezing agent and has a hydrogen ion exponent of less than 9.0.

(35) The tire puncture sealant according to (34) above, in which the hydrogen ion exponent is 7.5 or more.

(36) The tire puncture sealant according to (34) or (35) above, in which a content of the antifreezing agent is 100 to 400 parts by weight with respect to 100 parts by weight of a solid content of the chloroprene emulsion.

(37) The tire puncture sealant according to any one of (34) to (36) above, further including a tackifier.

(38) The tire puncture sealant according to (37) above, in which the tackifier is in the form of an emulsion obtained by emulsifying a resin.

(39) The tire puncture sealant according to (37) or (38) above, in which the tackifier contains at least one selected from the group consisting of a rosin resin, a terpene resin, and a hydrogenated terpene resin.

(40) The tire puncture sealant according to any one of (37) to (39) above, in which a solid content of the tackifier is 50 to 250 parts by weight with respect to 100 parts by weight of the solid content of the chloroprene emulsion.

(41) The tire puncture sealant according to any one of (34) to (40), in which an acid is used to lower the hydrogen ion exponent.

The tire puncture sealant of any of first to third aspects of the present invention has a comparatively low viscosity and an excellent storage stability, while showing sealing properties equivalent to those of a conventional tire puncture sealant.

When the tire puncture sealant of any of the first to third aspects of the present invention has a hydrogen ion exponent of 5.5 to 8.5, the tire puncture sealant has no pungent odor and hardly causes corrosion of steel cord.

The tire puncture sealant in a fourth aspect of the present invention has a less pungent odor and hardly causes corrosion of steel cord.

The tire puncture sealant in the fourth aspect of the present invention has a comparatively low viscosity and an excellent storage stability while showing sealing properties equivalent to those of a conventional tire puncture sealant, when the synthetic resin emulsion is at least one emulsion selected from the group consisting of a urethane emulsion, an acrylic emulsion, a polyolefin emulsion, an ethylene-vinyl acetate emulsion, a vinyl acetate emulsion, and a polyvinyl chloride emulsion.

The tire puncture sealant in a fifth aspect of the present invention has a comparatively low viscosity and a less odor, while showing sealing properties equivalent to those of a conventional tire puncture sealant.

In addition, the tire puncture sealant in the fifth aspect of the present invention is excellent in storage stability and the like, and can be stored in a car for a long period of time when the tire puncture sealant has a hydrogen ion exponent of 7.5 or more.

Rust hardly occurs on steel tire cord when the tire puncture sealant in the fifth aspect of the present invention has a hydrogen ion exponent of 5.5 to 8.5.

DETAILED DESCRIPTION OF THE PREFERRED EMBODIMENTS

Hereinafter, the present invention will be described in more detail.

A tire puncture sealant according to the first aspect of the present invention includes a urethane emulsion and an antifreezing agent.

The urethane emulsion that may be used in the tire puncture sealant in the first aspect of the present invention is obtained by dispersing polyurethane particles in water. A preferable example of the urethane emulsion includes one obtained by reacting an ionizable group-containing urethane prepolymer with a neutralizing agent or a quaternizing agent in water.

A specific example of the urethane prepolymer that may be preferably used is one obtained by copolymerizing a polyisocyanate compound (A) having two or more isocyanate groups, a compound (B) having two or more active hydrogen atoms, and a compound (C) having a group reactive to isocyanate group and an ionizable group.

The polyisocyanate compound (A) may be any of various polyisocyanate compounds typically used in the production of a polyurethane resin. Specific examples of the polyisocyanate compound include tolylene diisocyanates (TDI) such as 2,4-tolylene diisocyanate and 2,6-tolylene diisocyanate; diphenylmethane diisocyanate (MDI) such as diphenylmethane-4,4-diisocyanate; tetramethylxylylene diisocyanate (TMXDI); trimethylhexamethylene diisocyanate (TMH-MDI); 1,5-naphthalene diisocyanate; ethylene diisocyanate; propylene diisocyanate; tetramethylene diisocyanate; hexamethylene diisocyanate (HDI); isophorone diisocyanate (IPDI); xylylene diisocyanate (XDI); triphenylmethane triisocyanate; diisocyanate with norbornane skeleton (NBDI); and modified products such as isocyanurates derived therefrom.

These may be used alone or in combination of two or more.

Of these isocyanate group-containing compounds, TDI and MDI are preferable. These are general purpose polyisocyanates and therefore are inexpensive and readily available.

The compound (B) is not specifically limited as long as it is a compound having two or more active hydrogen atoms. Specific examples of the compound include a polyol compound, an amine compound, and an alkanolamine. These may be used alone or in combination of two or more.

Of these, the polyol compound is preferable.

Specific examples of the polyol compound include polyether polyols such as polytetramethylene glycol, polyethylene glycol, polypropylene glycol, polyoxypropylene glycol, and polyoxybutylene glycol; polycaprolactone polyols; polycarbonate polyols; polyolefin polyols such as polybutadiene polyol and polyisoprene polyol; adipate polyols; and polyester polyols such as castor oil. These may be used alone or in combination of two or more.

Of these, in terms of their excellent storage stability, the polyether polyols, polycaprolactone polyols, polycarbonate polyols, and polyester polyols are preferable, and the polyether polyols and polyester polyols are more preferable.

The polyol compound has a number average molecular weight of preferably about 500 to 10,000 and more preferably about 2,000 to 6,000.

Specific examples of the amine compound include ethylenediamine and hexamethylenediamine.

Specific examples of the alkanolamine include ethanolamine and propanolamine.

The compound (C) is a compound having a group reactive to isocyanate group and an ionizable group.

Specific examples of the group reactive to isocyanate group include hydroxy group, amino group (—$NH_2$), imino group (—NH—), and mercapto group.

The term "ionizable group" as used herein refers to a group that may be positively or negatively charged by neutralization, and specifically refers to an anionic group or a cationic group.

The term "anionic group" refers to a group that may be negatively charged by neutralization with a base. Specific examples of the anionic group that may be preferably used include carboxy group, sulfo group, and phosphate group. The term "cationic group" refers to a group that may be positively charged by neutrization with an acid or reaction with a quaternizing agent. Specific example of the cationic group that may be preferably used includes a tertiary amino group.

When the ionizable group is an anionic group, in general, there is no need to adjust the pH of the tire puncture sealant. In addition, the resulting tire puncture sealant has no pungent odor and hardly causes corrosion of steel cord, and therefore is preferable.

Hereinafter, a urethane emulsion obtained when the ionizable group is an anionic group is referred to as an anionic urethane emulsion, whereas a urethane emulsion obtained when the ionizable group is a cationic group is referred to as a cationic urethane emulsion.

Specific examples of the compound having the group reactive to isocyanate group and the anionic group (hereinafter referred to as the "compound (C1)") include: aliphatic monohydroxycarboxylic acids such as hydroxyacetic acid, hydroxypropionic acid, and hydroxybutyric acid; aromatic monohydroxycarboxylic acids such as hydroxybenzoic acid, hydroxyethyl benzoic acid, and hydroxycinnamic acid; dihydroxycarboxylic acids such as dimethylolpropionic acid, dimethylolbutanoic acid, and dimethylolacetic acid; mercaptocarboxylic acids such as mercaptoacetic acid, mercaptopropionic acid, and mercaptobenzoic acid; aminocarboxylic acids such as aminoadipic acid and aminobenzoic acid; hydroxysulfonic acids such as hydroxybenzenesulfonic acid; mercaptosulfonic acids such as 3N-mercaptoethanesulfonic acid; and aminosulfonic acids such as aminobenzenesulfonic acid. These may be used alone or in combination of two of more.

A preferable example of the compound having the group reactive to isocyanate group and the cationic group (hereinafter referred to as the "compound (C2)") includes a compound having the group reactive to isocyanate group and a tertiary amino group.

An example of such compound that may be preferably used includes a compound represented by the following formula (1):

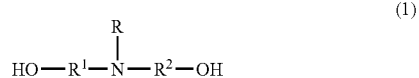

(1)

wherein R represents an alkyl group or a hydroxyalkyl group having 1 to 4 carbon atoms, and $R^1$ and $R^2$ may be the same or different and each independently represent an alkylene group having 1 to 4 carbon atoms.

Examples of the compound represented by the formula (1) include a diol compound having a tertiary amino group and a triol compound having a tertiary amino group.

Specific examples of the compound (C2) include alkanolamines such as N-methyl-N,N-diethanolamine, N-ethyl-N,N-diethanolamine, N-isobutyl-N,N-diethanolamine, diisopropanolamine, and triethanolamine. These may be used alone or in combination of two or more.

The method of producing the urethane prepolymer is not particularly limited, but may be, for example, a method in which the polyisocyanate compound (A), the compound (B), and the compound (C) are simultaneously stirred for polymerization.

In the production of the urethane prepolymer, the order of addition of the compound (B) and the compound (C) is not particularly limited and they may be simultaneously added or one of them may be added first. An exemplary method that may be used involves reacting the polyisocyanate compound (A) and the compound (B) according to a common urethane prepolymer production method to produce the urethane prepolymer, then adding the compound (C) to the urethane prepolymer for addition polymerization.

The copolymerization is preferably carried out such that the content of isocyanate groups in the resulting urethane prepolymer (NCO %) is in the range of 0.3 to 3%.

In a preferred embodiment, 1 to 50% by weight of the polyisocyanate compound (A), 30 to 90% by weight of the compound (B), and 0.1 to 20% by weight of the compound (C) are mixed with respect to the total weight of the polyisocyanate compound (A), the compound (B), and the compound (C) and the mixture is stirred at 60 to 90° C. for about 2 to 8 hours in an inert gas atmosphere. NCO % as used herein means a weight percentage of NCO groups with respect to the total weight of the urethane prepolymer.

The copolymerization may be carried out optionally in the presence of a urethanation catalyst such as an organotin compound, organobismuth, or amine, and preferably in the presence of an organotin compound.

Specific examples of the organotin compound include stannous carboxylates such as stannous acetate, stannous octanoate, stannous laurate, and stannous oleate; dialkyl tin salts of carboxylic acids such as dibutyltin acetate, dibutyltin dilaurate, dibutyltin maleate, dibutyltin di-2-ethylhexoate, dilauryltin diacetate, and dioctyltin diacetate; trialkyltin hydroxides such as trimethyltin hydroxide, tributyltin hydroxide, and trioctyltin hydroxide; dialkyltin oxides such as dibutyltin oxide, dioctyltin oxide, and dilauryltin oxide; and dialkyltin chlorides such as dibutyltin dichloride and dioctyltin dichloride. These may be used alone or in combination of two or more.

Of these, dibutyltin dilaurate, dibutyltin acetate, and dibutyltin maleate are preferable in terms of their relatively low cost and ease of handling.

The urethane prepolymer that may be obtained by the copolymerization as described above has a weight average molecular weight of preferably 1,500 to 30,000 and more preferably 3,000 to 20,000.

The urethane prepolymer is emulsified by reaction with a neutralizing agent in water, resulting in a stabilized urethane emulsion. When a urethane prepolymer having a cationic group is used, a quaternizing agent may be used instead of the neutralizing agent.

When a urethane prepolymer having an anionic group is used, a base may be used for the neutralizing agent without any particular limitation, as long as the base is a Lewis base. Specific examples thereof include sodium hydroxide, potassium hydroxide, and tertiary amine. These may be used alone or in combination of two or more. Of these, triethylamine is preferable.

When a urethane prepolymer having a cationic group is used, an acid may be used for the neutralizing agent without any particular limitation, as long as the acid is a Lewis acid. Specific examples thereof include inorganic acids such as hydrochloric acid, sulfuric acid, nitric acid, phosphoric acid, and phosphorous acid; and organic acids such as acetic acid, propionic acid, formic acid, butyric acid, lactic acid, malic acid, and citric acid. These may be used alone or in combination of two or more. Of these, hydrochloric acid and acetic acid are preferable.

The quaternizing agent is a compound that may quaternize the tertiary amino group of the urethane prepolymer. Specific examples of the quaternizing agent include epoxy compounds such as ethylene oxide, propylene oxide, butylene oxide, styrene oxide, and epichlorohydrin; dialkyl sulfates such as dimethyl sulfate and diethyl sulfate; alkyl sulfonates such as methyl p-toluenesulfonate; and alkyl halides such as methyl chloride, ethyl chloride, benzyl chloride, methyl bromide, and ethyl bromide.

The urethane prepolymer can be dispersed in water by optionally adding a viscosity modifier or a chain extender in addition to the above-mentioned neutralizing agent or quaternizing agent.

The viscosity modifier may be an organic solvent having compatibility with water. Specific examples of the viscosity modifier that may be preferably used include ethyl acetate, acetone, and methyl ethyl ketone.

Specific examples of the chain extender include aliphatic diamines such as ethylenediamine, propylenediamine, hexamethylenediamine, and triethylenetetramine; alicyclic diamines such as isophoronediamine and piperazine; aromatic diamines such as diphenyldiamine; and triamines.

The method of producing the urethane emulsion is not particularly limited, but may be, for example, a method in which the urethane prepolymer and the neutralizing agent or the quaternizing agent, and optionally the viscosity modifier and/or the chain extender are added to water and mixed with stirring.

Specific examples of the antifreezing agent that may be used in the tire puncture sealant of the first aspect of the present invention include ethylene glycol and propylene glycol. These may be used alone or in combination of two or more.

The content of the antifreezing agent is preferably 100 to 500 parts by weight, more preferably 150 to 450 parts by weight, and still more preferably 200 to 350 parts by weight with respect to 100 parts by weight of the solid content of the urethane emulsion in terms of its excellent performance in preventing the tire puncture sealant from freezing.

The solid content of the urethane emulsion as used herein refers to the total amount of the respective components in the urethane emulsion with the exclusion of water and a solvent.

It is preferable for the tire puncture sealant in the first aspect of the present invention to further include a tackifier in terms of its excellent sealing properties.

Specific examples of the tackifier include rosin resins such as rosin ester, polymerized rosin ester, and modified rosin; terpene resins such as terpene phenol and aromatic terpene; a hydrogenated terpene resin prepared through hydrogenation of a terpene resin; a phenol resin; and a xylene resin. In addition, an emulsion obtained by emulsifying any of these resins is one of preferred embodiments in terms of its excellent compatibility with the urethane emulsion. These may be used alone or in combination of two or more.

Of these, a tackifier containing at least one selected from the group consisting of a rosin resin, a terpene resin, and a hydrogenated terpene resin is preferable in terms of its excellent sealing properties.

The solid content of the tackifier is preferably 50 to 200 parts by weight, more preferably 70 to 200 parts by weight, and still more preferably 80 to 180 parts by weight with respect to 100 parts by weight of the solid content of the urethane emulsion in terms of its excellent sealing properties.

The solid content of the tackifier as used herein refers to the total amount of the respective components in the tackifier with the exclusion of water and a solvent.

In addition to the respective components as described above, the tire puncture sealant in the first aspect of the present invention may contain as desired any of various additives including a filler, an antiaging agent, an antioxidant, a pigment (dye), a plasticizer, a thixotropic agent, a UV absorber, a flame retardant, a surfactant (including a leveling agent), a dispersant, a dehydrating agent, and an antistatic agent.

Organic or inorganic fillers in various forms are used for the filler. Specific examples of the filler include fumed silica, pyrogenic silica, precipitated silica, crushed silica, fused silica; diatomaceous earth; iron oxide, zinc oxide, titanium oxide, barium oxide, magnesium oxide; calcium carbonate, magnesium carbonate, zinc carbonate; agalmatolite clay, kaolin clay, calcined clay; carbon black; and fatty acid-treated products, resin acid-treated products, urethane compound-treated products and fatty acid ester-treated products thereof.

A specific example of the antiaging agent includes a hindered phenol compound.

Specific examples of the antioxidant include butylhydroxytoluene (BHT) and butylhydroxyanisol (BHA).

Specific examples of the pigment include inorganic pigments such as titanium oxide, zinc oxide, ultramarine blue, red oxide, lithopone, lead, cadmium, iron, cobalt, aluminum, hydrochloride, and sulfate; and organic pigments such as azo pigment, phthalocyanine pigment, quinacridone pigment, quinacridone quinone pigment, dioxazine pigment, anthrapyrimidine pigment, anthanthrone pigment, indanthrone pigment, flavanthrone pigment, perylene pigment, perinone pigment, diketopyrrolopyrrole pigment, quinonaphthalone pigment, anthraquinone pigment, thioindigo pigment, benzimidazolone pigment, isoindoline pigment, and carbon black.

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; adipic acid propylene glycol polyester, and adipic acid butylene glycol polyester.

Specific examples of the thixotropic agent include AEROSIL (manufactured by Nippon Aerosil Co., Ltd.) and DISPARLON (manufactured by Kusumoto Chemicals, Ltd.).

Specific examples of the flame retardant include chloroalkyl phosphate, dimethyl methylphosphonate, bromine/phosphorus compounds, ammonium polyphosphate, neopentyl bromide polyether, and brominated polyether.

Specific examples of the antistatic agent include quaternary ammonium salts; and hydrophilic compounds such as polyglycol and ethylene oxide derivatives.

The method of producing the tire puncture sealant in the first aspect of the present invention is not particularly limited, but may be, for example, a method in which the urethane emulsion and the antifreezing agent, and optionally the tackifier and any of the various additives are incorporated in a reaction vessel and then sufficiently mixed under reduced pressure with a stirring device such as a blender.

The tire puncture sealant in the first aspect of the present invention preferably has a hydrogen ion exponent (pH) of 5.5 to 8.5. When the pH is within this range, steel cord is hardly corroded.

In the case where an anionic urethane emulsion is employed, the tire puncture sealant is excellent in stability at the pH within the above-mentioned range. Thus, it is not necessary to add ammonia or the like for stabilization, and there is no pungent odor. Because of these excellent properties, the tire puncture sealant using the anionic urethane emulsion preferably has a pH of 6.0 to 8.0 and more preferably 6.5 to 8.0.

An acid may be added to the tire puncture sealant using the anionic urethane emulsion so that its pH is adjusted to fall within the above-mentioned range. Specific examples of the acid include, but are not limited to, inorganic acids such as hydrochloric acid, sulfuric acid, nitric acid, phosphoric acid, and phosphorous acid; and organic acids such as acetic acid, propionic acid, formic acid, butyric acid, lactic acid, malic acid, and citric acid. These may be used alone or in combination of two or more.

In the case where a cationic urethane emulsion is employed, the tire puncture sealant is generally excellent in stability at a pH of 4.0 to 6.0. On the other hand, in a preferred embodiment, the tire puncture sealant has a pH of 5.5 to 8.5 because steel cord can be prevented from being corroded. The tire puncture sealant using the cationic urethane emulsion preferably has a pH of 6.0 to 8.0 and more preferably 6.5 to 8.0 in terms of its excellent balance between the stability and rustproof properties.

A base may be added to the tire puncture sealant using the cationic urethane emulsion so that its pH is adjusted to fall within the above-mentioned range. The base is not particularly limited but is preferably one having no pungent odor, and specific examples thereof include sodium hydroxide, potassium hydroxide, and tertiary amine. These may be used alone or in combination of two or more.

Of these, triethylamine is preferable in terms of the safety and water resistance after sealing.

Hereinafter, the usage of the tire puncture sealant in the first aspect of the present invention will be described. However, the usage of the tire puncture sealant in the first aspect of the present invention is not limited to the method described below.

First, the tire puncture sealant in the first aspect of the present invention is injected into a tire of a car through an air-charging portion of the tire. The method of injecting the tire puncture sealant in the first aspect of the present invention into the tire is not particularly limited but any conventionally known method may be used, as exemplified by a method using a syringe, a spray can, or the like. The amount of the tire puncture sealant to be injected into the tire is not particularly limited but may be selected as appropriate for the size of a puncture or the like.

Next, the tire is inflated up to a predetermined tire pressure.

Then, the car is driven. The compression and shearing forces which the tire receives when it rotates and touches the ground cause polyurethane particles to agglomerate to seal the puncture.

The tire puncture sealant in the first aspect of the present invention has a comparatively low viscosity and an excellent storage stability, while showing sealing properties equivalent to those of a conventional tire puncture sealant.

Further, when having a hydrogen ion exponent of 5.5 to 8.5, the tire puncture sealant in the first aspect of the present invention has no pungent odor and hardly corrodes steel cord, and may hardly cause inflammation of skin even when the skin touches the sealant.

Next, the tire puncture sealant in the second aspect of the present invention will be described.

The tire puncture sealant in the second aspect of the present invention includes an acrylic emulsion and an antifreezing agent.

The acrylic emulsion that may be used in the tire puncture sealant of the second aspect of the present invention is not particularly limited but any known acrylic emulsion may be used.

The acrylic emulsion is preferably an aqueous emulsion prepared by polymerization (emulsion polymerization) of any of, for example, methacrylate, acrylate, aromatic vinyl monomer, unsaturated nitrile, conjugated diolefin, polyfunctional vinyl monomer, amide monomer, hydroxy group-containing monomer, caprolactone-addition monomer, amino group-containing monomer, glycidyl group-containing monomer, acid monomer and vinyl monomer, with an emulsifying dispersant.

Specific examples of the methacrylate include methyl methacrylate, ethyl methacrylate, butyl methacrylate, hexyl methacrylate, cyclohexyl methacrylate, nonyl methacrylate, and lauryl methacrylate.

Specific examples of the acrylate include butyl acrylate, hexyl acrylate, and 2-ethylhexyl acrylate.

Specific examples of the aromatic vinyl monomer include p-methylstyrene, α-methylstyrene, p-chlorostyrene, chloromethylstyrene, and vinyltoluene.

Specific examples of the unsaturated nitrile include acrylonitrile and methacrylonitrile.

Specific examples of the conjugated diolefin include butadiene, isoprene, and chloroprene.

Specific examples of the polyfunctional vinyl monomer include divinylbenzene, ethylene glycol diacrylate, ethylene glycol dimethacrylate, diethylene glycol diacrylate, diethylene diglycol dimethacrylate, allyl methacrylate, diallyl phthalate, trimethylolpropane triacrylate, glycerin diallyl ether, polyethylene glycol dimethacrylate, and polyethylene glycol diacrylate.

Specific examples of the amide monomer include acrylamide, methacrylamide, and N-methylol methacrylamide.

Specific examples of the hydroxy group-containing monomer include β-hydroxyethyl acrylate and β-hydroxyethylmethacrylate.

Specific examples of the caprolactone-addition monomer include β-hydroxyethyl acrylates containing of caprolactone and β-hydroxyethylmethacrylates containing of caprolactone such as FA-1, FA-2, FA-3, and FM-1 manufactured by Daicel Chemical Industries, Ltd.

Specific examples of the amino group-containing monomer include dimethylaminoethyl acrylate and diethylaminoethyl acrylate.

Specific examples of the glycidyl group-containing monomer include glycidyl acrylate and diglycidyl methacrylate.

Specific examples of the acid monomer include acrylic acid, methacrylic acid, itaconic acid, and p-vinylbenzoic acid.

Specific examples of the vinyl monomer include vinyl acetate, vinyl chloride, and vinylidene chloride.

Of these, the acrylate and methacrylate are preferable in terms of their cost, ease of handling and physical properties.

Examples of the emulsifying dispersant include a nonionic surfactant, an anionic surfactant, a cationic surfactant, and an amphoteric surfactant. Of these, the nonionic surfactant is preferable because of its neutrality and less odor.

Specific examples of the nonionic surfactant include fatty acid sorbitan ester, polyoxyethylene fatty acid sorbitan, polyoxyethylene higher alcohol ether, polyoxyethylene-polyoxypropylene higher alcohol ether, polyoxyethylene fatty acid ester, polyoxyethylene alkylphenol, polyoxyethylene alkylamine, and polyoxyethylene-polyoxypropylene block polymer.

Specific examples of the anionic surfactant include alkali metal salts of fatty acids, alkyl sulfates, alkyl ether sulfates, alkyl benzene sulfonates, N-acyl-N-methyl taurinates, dialkyl sulfosuccinates, and N-alkyl-N,N-dimethyl oxides.

Specific examples of the cationic surfactant include alkylamine acetates and quaternary ammonium salts such as alkyl trimethyl ammonium chloride.

Specific examples of the amphoteric surfactant include dimethyl alkyl betaine and alkylamide betaine.

A reactive surfactant having a reactive double bond in the molecule, a water-soluble polymer such as polyvinyl alcohol or starch may be used for the emulsifying dispersant.

The emulsifying dispersant may be used alone or in combination of two or more.

The acrylic emulsion has a weight average molecular weight of preferably 10,000 to 500,000 and more preferably 50,000 to 200,000.

The acrylic emulsion has a solid content of preferably 30 to 60% by weight and more preferably 40 to 55% by weight.

In the present invention, a commercially available product may be used for the acrylic emulsion and examples thereof include A6001 manufactured by Regitex Co., Ltd., and Lx823 manufactured by Zeon Corporation.

Specific examples of the antifreezing agent that may be preferably used in the tire puncture sealant of the second aspect of the present invention include ethylene glycol and propylene glycol. These may be used alone or in combination of two or more.

The content of the antifreezing agent is preferably 100 to 500 parts by weight, more preferably 120 to 350 parts by weight and still more preferably 140 to 300 parts by weight with respect to 100 parts by weight of the solid content of the acrylic emulsion in terms of its excellent performance in preventing the tire puncture sealant from freezing.

The solid content of the acrylic emulsion as used herein refers to the total amount of the respective components in the acrylic emulsion with the exclusion of water and a solvent.

It is preferable for the tire puncture sealant in the second aspect of the present invention to further include a tackifier in terms of its excellent sealing properties.

Those illustrated for use in the tire puncture sealant of the first aspect of the present invention may be used for the tackifier.

The solid content of the tackifier is preferably 50 to 200 parts by weight, more preferably 70 to 200 parts by weight, and still more preferably 80 to 180 parts by weight with respect to 100 parts by weight of the solid content of the acrylic emulsion in terms of its excellent sealing properties.

The solid content of the tackifier as used herein refers to the total amount of the respective components in the tackifier with the exclusion of water and a solvent.

In addition to the respective components as described above, the tire puncture sealant in the second aspect of the present invention may contain as desired any of various additives including a filler, an antiaging agent, an antioxidant, a pigment (dye), a plasticizer, a thixotropic agent, a UV absorber, a flame retardant, a surfactant (including a leveling agent), a dispersant, a dehydrating agent, and an antistatic agent.

Those illustrated for use in the tire puncture sealant of the first aspect of the present invention may be used for the above-mentioned various additives.

The method of producing the tire puncture sealant in the second aspect of the present invention is not particularly limited, but may be, for example, a method in which the acrylic emulsion and the antifreezing agent, and optionally the tackifier and any of the various additives are incorporated in a reaction vessel and then sufficiently mixed under reduced pressure with a stirring device such as a blender.

The tire puncture sealant in the second aspect of the present invention preferably has a pH of 5.5 to 8.5. When the pH is within this range, steel cord is hardly corroded.

The tire puncture sealant in the second aspect of the present invention is generally excellent in stability at a pH within this range. Thus, it is not necessary to add ammonia or the like for stabilization, and there is no pungent odor. Because of these excellent properties, the tire puncture sealant in the second aspect of the present invention has a pH of preferably 6.0 to 8.0 and more preferably 6.5 to 8.0.

An acid or a base may be added to the tire puncture sealant in the second aspect of the present invention to adjust its pH to fall within the above-mentioned range.

Specific examples of the acid include, but are not particularly limited to, inorganic acids such as hydrochloric acid, sulfuric acid, nitric acid, phosphoric acid, and phosphorous acid; and organic acids such as acetic acid, propionic acid, formic acid, butyric acid, lactic acid, malic acid, and citric acid. These may be used alone or in combination of two or more.

Preferable examples of the base include, but are not particularly limited to, those having no pungent odor, specifically, sodium hydroxide, potassium hydroxide, and tertiary amine. These may be used alone or in combination of two or more. Of these, triethylamine is preferable in terms of the safety and water resistance after sealing.

The usage of the tire puncture sealant in the second aspect of the present invention is the same as that in the first aspect of the present invention.

The tire puncture sealant in the second aspect of the present invention has a comparatively low viscosity and an excellent storage stability, while showing sealing properties equivalent to those of a conventional tire puncture sealant.

Further, when having a hydrogen ion exponent of 5.5 to 8.5, the tire puncture sealant in the second aspect of the present invention has no pungent odor and hardly corrodes steel cord, and may hardly cause inflammation of skin even when the skin touches the sealant.

Next, the tire puncture sealant in the third aspect of the present invention will be described.

The tire puncture sealant in the third aspect of the present invention includes a polyolefin emulsion and an antifreezing agent.

The polyolefin emulsion that may be used in the tire puncture sealant of the third aspect of the present invention is not particularly limited but any known polyolefin emulsion may be used.

For example, an emulsion in water of a polyolefin having hydrophilic group introduced therein may be used for the polyolefin emulsion. Examples of the hydrophilic group include carboxy group, sulfonate group, phosphate group, hydroxy group, and amino group.

Specific examples of the polyolefin emulsion that may be preferably used include a polyethylene emulsion, a polypropylene emulsion, an ethylene-propylene copolymer emulsion, and a polybutene emulsion.

These may be used alone or in combination of two or more.

The polyethylene emulsion is not particularly limited but any known polyethylene emulsion may be used.

For example, an emulsion in water of polyethylene having hydrophilic group introduced therein may be used for the polyethylene emulsion. Examples of the hydrophilic group include carboxy group, sulfonate group, phosphate group, hydroxy group, and amino group.

A polyethylene emulsion prepared by dispersing polyethylene in water with an emulsifying dispersant may also be used.

The emulsifying dispersant used may be the same as that illustrated for the tire puncture sealant of the second aspect of the present invention.

The polyethylene preferably has a melting point of 90 to 150° C. and a weight average molecular weight of 1,000 to 1,000,000.

The term "melting point" as used herein refers to a value obtained by measurement according to a softening point testing method (ring and ball method) as defined in JIS K2207.

In the present invention, a commercially available product may be used for the polyethylene emulsion and examples thereof include JW-150 manufactured by Johnson Polymer, Wax Dispersion W867 manufactured by Clariant, Nopcoat PEM-17 manufactured by San Nopco Ltd., and PE401 manufactured by Naruse Chemical Co., Ltd.

The polypropylene emulsion is not particularly limited but any known polypropylene emulsion may be used.

For example, an emulsion in water of polypropylene having hydrophilic group introduced therein may be used for the polypropylene emulsion. Examples of the hydrophilic group include carboxy group, sulfonate group, phosphate group, hydroxy group, and amino group.

A polypropylene emulsion prepared by dispersing polypropylene in water with an emulsifying dispersant may also be used.

The emulsifying dispersant used may be the same as that illustrated for the tire puncture sealant of the second aspect of the present invention.

The polypropylene preferably has a melting point of 90 to 150° C. and a weight average molecular weight of 1,000 to 1,000,000.

In the present invention, a commercially available product may be used for the polypropylene emulsion and an example thereof includes PP emulsion manufactured by Maruyoshi Kasei K.K.

The ethylene-propylene copolymer emulsion is not particularly limited but any known ethylene-propylene copolymer emulsion may be used.

For example, an emulsion in water of an ethylene-propylene copolymer having hydrophilic group introduced therein may be used for the ethylene-propylene copolymer emulsion. Examples of the hydrophilic group include carboxy group, sulfonate group, phosphate group, hydroxy group, and amino group.

An ethylene-propylene copolymer emulsion prepared by dispersing an ethylene-propylene copolymer in water with an emulsifying dispersant may also be used.

The emulsifying dispersant used may be the same as that illustrated for the tire puncture sealant of the second aspect of the present invention.

The ethylene-propylene copolymer preferably has a melting point of 90 to 150° C. and a weight average molecular weight of 1,000 to 1,000,000.

In the present invention, a commercially available product may be used for the ethylene-propylene copolymer emulsion and an example thereof includes HS manufactured by Regitex Co., Ltd.

The polybutene emulsion is not particularly limited but any known polybutene emulsion may be used.

For example, an emulsion in water of polybutene having hydrophilic group introduced therein may be used for the polybutene emulsion. Examples of the hydrophilic group include carboxy group, sulfonate group, phosphate group, hydroxy group, and amino group.

A polybutene emulsion prepared by dispersing polybutene in water with an emulsifying dispersant may also be used.

The emulsifying dispersant used may be the same as that illustrated for the tire puncture sealant of the second aspect of the present invention.

A specific example of the polybutene emulsion includes an emulsified product prepared from polybutene and water, which contains a polymer having a structural unit based on a methacrylate containing a phosphorylcholine-analogous group represented by the following formula (2):

$$H_2C=\underset{CH_3}{\overset{}{C}}-\underset{O}{\overset{\|}{C}}-O-R^3-O\underset{O^-}{\overset{O}{\overset{\|}{P}}}O-(CH_2)_2-\overset{+}{N}(CH_3)_3 \quad (2)$$

wherein $R^3$ is $-(CH_2)_m-$ or $-(CH_2CH_2O)_n-CH_2CH_2-$, and m and n are each an integer of 1 to 10. This polymer is hereinafter referred to as the "polymer (A)".

Specific examples of the monomer represented by the formula (2) include 2-methacryloyloxyethyl-2'-(trimethylammonio)ethyl phosphate, 3-methacryloyloxypropyl-2'-(trimethylammonio)ethyl phosphate, 4-methacryloyloxybutyl-2'-(trimethylammonio)ethyl phosphate, 2-methacryloyloxyethoxyethyl-2'-(trimethylammonio)ethyl phosphate, and 2-methacryloyloxydiethoxyethyl-2'-(trimethylammonio)ethyl phosphate. These may be used alone or in combination of two or more.

Of these, 2-methacryloyloxyethyl-2'-(trimethylammonio) ethyl phosphate is preferable.

The polymer (A) is a single polymer prepared by singly polymerizing a monomer represented by the formula (2) or a copolymer prepared by copolymerizing it with any other copolymerizable vinyl monomer.

Examples of the other copolymerizable vinyl monomer include styrene monomers such as styrene, methylstyrene, and chlorostyrene; vinyl ether monomers such as vinyl acetate and vinyl propionate; alkyl (meth)acrylate monomers such as methyl (meth)acrylate, ethyl (meth)acrylate, n-butyl (meth)acrylate, lauryl (meth)acrylate, stearyl (meth)acrylate, and 2-ethylhexyl (meth)acrylate; (meth)acrylic acid; functional group-containing (meth)acrylates such as 2-hydroxyethyl (meth)acrylate and glycerol (meth)acrylate; polyalkylene glycol (meth)acrylates such as polyethylene glycol (meth)acrylate and polypropylene glycol (meth)acrylate; and nitrogen-containing monomers such as (meth)acrylamide, N-vinylpyrrolidone, and acrylonitrile. These may be used alone or in combination of two or more.

Of these, a (meth)acrylate monomer is preferable in terms of the controlled balance between the hydrophilicity and the hydrophobicity of the polymer (A) and the copolymerization property at the time of reaction. A (meth)acrylate monomer having 1 to 24 carbon atoms in the alkyl chain is preferable in terms of the stability of the polybutene emulsion.

When the monomer represented by the formula (2) is copolymerized with any other monomer, the content of the monomer represented by the formula (2) is preferably 1 to 90% by weight and more preferably 5 to 80% by weight. When the content falls within the range, the resulting copolymer can sufficiently exhibit the properties of both the monomers.

The polymer (A) serves as a dispersant or an emulsifier for dispersing or emulsifying polybutene in water, and it also serves as a stabilizer for a filler, a drug, or the like to be optionally added. In addition, the polymer (A) is inactive to the biological components and is less pungent, and hence can be safely used.

The polymer (A) can be obtained by polymerizing the respective monomer components described above in an inert gas atmosphere such as nitrogen, carbon dioxide or helium in the presence of a radical polymerization initiator, by any known method such as mass polymerization, suspension polymerization, emulsion polymerization, and solution polymerization.

Examples of the polymerization initiator include, but are not specifically limited to, benzoyl peroxide, lauroyl peroxide, diisopropyl peroxydicarbonate, t-butyl peroxy-2-ethylhexanoate, t-butyl peroxy bivarate, t-butyl peroxydiisobutyrate, azobisisobutyronitrile, azoisobis dimethylvaleronitrile, persulfate, and persulfate-bisulfite.

The polymerization initiator is preferably charged in an amount of 0.0001 to 10 parts by weight and more preferably 0.01 to 5 parts by weight with respect to 100 parts by weight of the monomer component.

The polymerization is preferably carried out at a temperature of 20 to 100° C. for 0.5 to 72 hours.

The polymer (A) has a weight average molecular weight of preferably 1,000 to 5,000,000 and more preferably 10,000 to 1,000,000 in terms of the compatibility with polybutene or water and the viscosity of the compound.

The polybutene may be an isobutylene homopolymer, a copolymer of isobutylene with its isomer, a copolymer of isobutylene with another olefin, a copolymer of isobutylene with its isomer and another olefin, or a hydride thereof. These may be used alone or in combination of two or more. Of these, hydrogenated polybutene, which is a hydride, is hardly subject to oxidative degradation due to heat or light and is therefore preferable.

Examples of the isomer include 1-butene, cis-2-butene, and trans-2-butene.

The polybutene is produced, for example, by polymerizing a gas mixture containing isobutylene with an acid catalyst such as aluminum chloride and optionally hydrogenating the polymer.

Low-viscosity to high-viscosity polybutenes can be produced by adjusting the amount of catalyst to be added and the reaction temperature in the polybutene production process.

Polybutene is an oily polymer which is a very safe material inactive to biological components as well and can impart sealing properties.

The polybutene is preferably of a liquid type or a viscous type and more preferably of a liquid type for the preparation of an emulsified product.

The polybutene preferably has a number average molecular weight of 150 to 4,000 because such polybutene exhibits liquidity or viscosity.

The content of the polymer (A) is preferably 1 to 50% by weight and more preferably 2 to 40% by weight. Within this range, the emulsified product is excellent in stability and is not excessively viscous.

The content of the polybutene is preferably 10 to 90% by weight and more preferably 20 to 80% by weight.

The content of water is preferably 9 to 89% by weight.

It is preferable for the emulsified product to further include a surfactant. Addition of a surfactant allows the emulsified product to have an improved stability.

Examples of the surfactant include a nonionic surfactant, an anionic surfactant, a cationic surfactant, and an amphoteric surfactant. These may be used alone or in combination of two or more.

In such surfactants, a fatty acid having an alkyl group preferably has a carbon chain length of $C_8$ to $C_{18}$ is preferable.

Specific examples of the nonionic surfactant include fatty acid sorbitan ester, polyoxyethylene fatty acid sorbitan, polyoxyethylene higher alcohol ether, polyoxyethylene-propylene higher alcohol ether, polyoxyethylenfe fatty acid ester, polyoxyethylene alkylphenol, polyoxyethylene alkylamine, and polyoxyethylene-polyoxypropylene block polymer.

Specific examples of the anionic surfactant include alkali metal salts of fatty acids, alkyl sulfates, alkyl ether sulfates, alkyl benzene sulfonates, N-acyl-N-methyl taurinates, dialkyl sulfosuccinates, and N-alkyl-N,N-dimethyl oxides.

Specific examples of the cationic surfactant include alkylamine acetates and quaternary ammonium salts such as alkyl trimethyl ammonium chloride.

Specific examples of the amphoteric surfactant include dimethyl alkyl betaine and alkylamide betaine.

The amount of surfactant to be added is preferably 0.01 to 10% by weight and more preferably 0.1 to 2% by weight. Within this range, addition of the surfactant achieves sufficiently high effect while ensuring high safety to cause less skin irritation.

The emulsified product may include any of various additives as far as the objects of the present invention can be achieved.

Specific examples of the additives include oily materials such as vegetable oils and fats, animal oils and fats, waxes, paraffins except polybutene, vaseline, fatty acid esters, higher fatty acids, and higher alcohols; inorganic compounds such as titanium oxide, zinc oxide, talc, silica, kaolin, sodium carbonate, and borax; organic solvents such as ethanol, isopropanol, ethylene glycol, propylene glycol, and glycerin; and water-soluble polymers such as polyethylene glycol, polypropylene glycol, polyvinyl alcohol, polyvinylpyrrolidone, carboxymethyl cellulose, a block copolymer of ethylene oxide and propylene oxide, and a copolymer of maleic anhydride and methyl vinyl ether.

The method of preparing the emulsified product may be carried out by any known method without any particular limitation. For example, the emulsified product can be produced by emulsifying the polybutene, the polymer (A), water, and optionally the surfactant and any of the various additives at a temperature ranging from room temperature to 90° C. in an emulsifier (e.g., homogenizer or homomixer) or kneader.

In the present invention, a commercially available product may be used for the polybutene emulsion and examples thereof include EMAWET 10E and EMAWET 30E (manufactured by NOF Corporation).

Specific examples of the antifreezing agent that may be used in the tire puncture sealant of the third aspect of the present invention include ethylene glycol and propylene glycol. These may be used alone or in combination of two or more.

The content of the antifreezing agent is preferably 90 to 500 parts by weight, more preferably 120 to 350 parts by weight, and still more preferably 140 to 300 parts by weight with respect to 100 parts by weight of the solid content of the polyolefin emulsion in terms of its excellent performance in preventing the tire puncture sealant from freezing.

The solid content of the polyolefin emulsion as used herein refers to the total amount of the respective components in the polyolefin emulsion with the exclusion of water and a solvent.

It is preferable for the tire puncture sealant in the third aspect of the present invention to further include a tackifier in terms of its excellent sealing properties.

Those illustrated for use in the tire puncture sealant of the first aspect of the present invention may be used for the tackifier.

The solid content of the tackifier is preferably 50 to 250 parts by weight and more preferably 70 to 220 parts by weight with respect to 100 parts by weight of the solid content of the polyolefin emulsion in terms of its excellent sealing properties.

The solid content of the tackifier as used herein refers to the total amount of the respective components in the tackifier with the exclusion of water and a solvent.

In addition to the respective components as described above, the tire puncture sealant in the third aspect of the present invention may contain as desired any of various additives including a filler, an antiaging agent, an antioxidant, a pigments (dye), a plasticizer, a thixotropic agent, a UV absorber, a flame retardant, a surfactant (including a leveling agent), a dispersant, a dehydrating agent, and an antistatic agent.

Those illustrated for use in the tire puncture sealant of the first aspect of the present invention may be used for the above-mentioned various additives.

The method of producing the tire puncture sealant in the third aspect of the present invention is not particularly limited, but may be, for example, a method in which the polyolefin emulsion and the antifreezing agent, and optionally the tackifier and any of the various additives are incorporated in a reaction vessel and then sufficiently mixed under reduced pressure with a stirring device such as a blender.

The tire puncture sealant in the third aspect of the present invention preferably has a pH of 5.5 to 8.5. When the pH is within this range, steel cord is hardly corroded.

The tire puncture sealant in the third aspect of the present invention is generally excellent in stability at a pH within this range. Thus, it is not necessary to add ammonia or the like for stabilization, and there is no pungent odor. Because of these excellent properties, the tire puncture sealant in the third aspect of the present invention has a pH of preferably 6.0 to 8.0 and more preferably 6.5 to 8.0.

An acid or a base may be added to the tire puncture sealant in the third aspect of the present invention to adjust its pH to fall within the above-mentioned range.

Specific examples of the acid include, but are not particularly limited to, inorganic acids such as hydrochloric acid, sulfuric acid, nitric acid, phosphoric acid, and phosphorous acid; and organic acids such as acetic acid, propionic acid, formic acid, butyric acid, lactic acid, malic acid, and citric acid. These may be used alone or in combination of two or more.

A base having no pungent odor is preferably used without any particular limitation and specific examples of the base that may be preferably used include sodium hydroxide, potassium hydroxide, and tertiary amine. These may be used alone or in combination of two or more. Of these, triethylamine is preferable in terms of the safety and water resistance after sealing.

The usage of the tire puncture sealant in the third aspect of the present invention is the same as that in the first aspect of the present invention.

The tire puncture sealant in third aspect of the present invention has a comparatively low viscosity and an excellent storage stability, while showing sealing properties equivalent to those of a conventional tire puncture sealant.

Further, when having a hydrogen ion exponent of 5.5 to 8.5, the tire puncture sealant in the third aspect of the present invention has no pungent odor and hardly corrode steel cord, and may hardly cause inflammation of skin even when the skin touches the sealant.

Next, the tire puncture sealant in the fourth aspect of the present invention will be described.

The tire puncture sealant in the fourth aspect of the present invention includes a synthetic resin emulsion and an antifreezing agent and has a hydrogen ion exponent (pH) of 5.5 to 8.5.

The synthetic resin emulsion that may be used in the tire puncture sealant of the fourth aspect of the present invention is not particularly limited but any known synthetic resin emulsion may be used.

Specific examples of the synthetic resin emulsion that may be preferably used include a urethane emulsion, an acrylic emulsion, a polyolefin emulsion, an ethylene-vinyl acetate emulsion, a vinyl acetate emulsion, and a polyvinyl chloride emulsion. These emulsions show comparatively good stability at a pH of 5.5 to 8.5.

These synthetic resin emulsions may be used alone or in combination of two or more.

Of these, the ethylene-vinyl acetate emulsion is more preferable.

The urethane emulsion, the acrylic emulsion, and the polyolefin emulsion used may be the same as those used in the tire puncture sealants in the first to third aspects of the present invention, respectively.

(Ethylene-Vinyl Acetate Emulsion)

For the ethylene-vinyl acetate emulsion (hereinafter, referred to as the "EVA emulsion"), conventionally known EVA emulsions may be used without any particular limitation.

A preferable example of the EVA emulsion includes an aqueous emulsion prepared by copolymerizing (emulsion polymerizing) ethylene and vinyl acetate monomer in the presence of an emulsifying dispersant.

The mole ratio between the ethylene and the vinyl acetate monomer to be blended for copolymerization is preferably 10/90 to 30/70.

In the present invention, other monomers may be optionally used to carry out copolymerization. Specific examples of such monomers include acrylates such as 2-ethylhexyl acrylate, butyl acrylate, and ethyl acrylate; methacrylates such as methyl methacrylate and butyl methacrylate; and vinyl esters such as vinyl chloride and vinyl versatate. Various other monomers may also be used, as exemplified by carboxy group-containing monomers such as acrylic acid and methacrylic acid; and monomers having functional groups such as sulfonate group, hydroxy group, epoxy group, methylol group, amino group, and amide group.

The emulsifying dispersant used may be the same as that used in the tire puncture sealant in the second aspect of the present invention. It is preferable to use a water-soluble polymer and more preferably polyvinyl alcohol (PVA).

The EVA emulsion has a weight average molecular weight of preferably 10,000 to 500,000 and more preferably 50,000 to 200,000.

The EVA emulsion has a solid content of preferably 40 to 70% by weight and more preferably 50 to 65% by weight.

In the present invention, a commercially available product may be used for the EVA emulsion and examples thereof include ethylene-vinyl acetate emulsions (Sumikaflex S7400, S400HQ, S467, 510HQ, 1010) manufactured by Sumika Chemtex Co., Ltd.

(Vinyl Acetate Emulsion)

Conventionally known vinyl acetate emulsions may be used without any particular limitation for the vinyl acetate emulsion.

A preferable example of the vinyl acetate emulsion includes an aqueous emulsion prepared by copolymerizing (emulsion polymerizing) vinyl acetate in the presence of an emulsifying dispersant.

In the present invention, other monomers may be optionally used to carry out copolymerization. Specific examples of such monomers include ethylene compounds such as ethylene and propylene; acrylates such as 2-ethylhexyl acrylate, butyl acrylate, and ethyl acrylate; methacrylates such as methyl methacrylate and butyl methacrylate; and vinyl esters such as vinyl chloride and vinyl versatate. Various other monomers may also be used, as exemplified by carboxy group-containing monomers such as acrylic acid and methacrylic acid; and monomers having functional groups such as sulfonate group, hydroxy group, epoxy group, methylol group, amino group, and amide group.

The emulsifying dispersant used may be the same as that illustrated for the tire puncture sealant of the second aspect of the present invention.

The vinyl acetate emulsion has a weight average molecular weight of preferably 10,000 to 500,000 and more preferably 50,000 to 200,000.

The vinyl acetate emulsion has a solid content of preferably 40 to 70% by weight and more preferably 50 to 65% by weight.

In the present invention, a commercially available product may be used for the vinyl acetate emulsion and an example thereof includes PEGAR manufactured by KOATSU GAS KOGYO CO., LTD.

(Polyvinyl Chloride Emulsion)

Conventionally known polyvinyl chloride emulsions may be used without any particular limitation for the polyvinyl chloride emulsion.

A preferable example of the polyvinyl chloride emulsion includes an aqueous emulsion prepared by copolymerizing (emulsion polymerizing) vinyl chloride in the presence of an emulsifying dispersant.

In the present invention, other monomers may be optionally used to carry out copolymerization. Specific examples of such monomers include ethylene compounds such as ethylene and propylene; acrylates such as 2-ethylhexyl acrylate, butyl acrylate, and ethyl acrylate; and methacrylates such as methyl methacrylate and butyl methacrylate. Various other monomers may also be used, as exemplified by carboxy group-containing monomers such as acrylic acid and methacrylic acid; and monomers having functional groups such as sulfonate group, hydroxy group, epoxy group, methylol group, amino group, and amide group.

The emulsifying dispersant used may be the same as that illustrated for the tire puncture sealant of the second aspect of the present invention.

The polyvinyl chloride emulsion has a weight average molecular weight of preferably 10,000 to 500,000 and more preferably 50,000 to 200,000.

The polyvinyl chloride emulsion has a solid content of preferably 40 to 70% by weight and more preferably 50 to 65% by weight.

In the present invention, a commercially available product may be used for the polyvinyl chloride emulsion and an example thereof includes SE-1010 manufactured by Sumika Chemtex Co., Ltd.

Specific examples of the antifreezing agent that may be used in the tire puncture sealant of the fourth aspect of the present invention include ethylene glycol and propylene glycol. These may be used alone or in combination of two or more.

The content of the antifreezing agent is preferably 100 to 500 parts by weight, more preferably 120 to 350 parts by weight, and still more preferably 140 to 300 parts by weight with respect to 100 parts by weight of the solid content of the synthetic resin emulsion in terms of its excellent performance in preventing the tire puncture sealant from freezing.

The solid content of the synthetic resin emulsion as used herein refers to the total amount of the respective components in the synthetic resin emulsion with the exclusion of water and a solvent.

It is preferable for the tire puncture sealant in the fourth aspect of the present invention to further include a tackifier in terms of its excellent sealing properties.

Those illustrated for use in the tire puncture sealant of the first aspect of the present invention may be used for the tackifier.

The solid content of the tackifier is preferably 50 to 200 parts by weight, more preferably 70 to 200 parts by weight, and still more preferably 80 to 180 parts by weight with respect to 100 parts by weight of the solid content of the synthetic resin emulsion in terms of its excellent sealing properties.

The solid content of the tackifier as used herein refers to the total amount of the respective components in the tackifier with the exclusion of water and a solvent.

In addition to the respective components as described above, the tire puncture sealant in the fourth aspect of the present invention may contain as desired any of various additives including a filler, an antiaging agent, an antioxidant, a pigment (dye), a plasticizer, a thixotropic agent, a UV absorber, a flame retardant, a surfactant (including a leveling agent), a dispersant, a dehydrating agent, and an antistatic agent.

Those illustrated for use in the tire puncture sealant of the first aspect of the present invention may be used for the above-mentioned various additives.

The method of producing the tire puncture sealant in the fourth aspect of the present invention is not particularly limited, but may be, for example, a method in which the synthetic resin emulsion and the antifreezing agent, and optionally the tackifier and any of the various additives are incorporated in a reaction vessel and then sufficiently mixed under reduced pressure with a stirring device such as a blender.

The tire puncture sealant in the fourth aspect of the present invention has a pH of 5.5 to 8.5. When the pH is within this range, steel cord is hardly corroded. Further, the tire puncture sealant in the fourth aspect of the present invention employs the synthetic resin emulsion, which is comparatively stable when the pH is within the above-mentioned range. Therefore, the amount of ammonia to be added can be decreased or ammonia is not necessary to add, thus causing a less pungent odor.

For these excellent properties, the tire puncture sealant in the fourth aspect of the present invention has a pH of preferably 6.0 to 8.0 and more preferably 6.5 to 8.0.

An acid or a base may be added to the tire puncture sealant in the fourth aspect of the present invention to adjust its pH to fall within the above-mentioned range.

Specific examples of the acid include, but are not particularly limited to, inorganic acids such as hydrochloric acid, sulfuric acid, nitric acid, phosphoric acid, and phosphorous acid; and organic acids such as acetic acid, propionic acid, formic acid, butyric acid, lactic acid, malic acid, and citric acid. These may be used alone or in combination of two or more.

A base having no pungent odor is preferably used without any particular limitation and specific examples of the base that may be preferably used include sodium hydroxide, potassium hydroxide, and tertiary amine. These may be used alone or in combination of two or more. Of these, triethylamine is preferable in terms of the safety and water resistance after sealing.

The usage of the tire puncture sealant of the fourth aspect of the present invention is the same as that in the first aspect of the present invention.

The tire puncture sealant in the fourth aspect of the present invention has a less pungent odor and hardly corrodes steel cord.

Further, the tire puncture sealant in the fourth aspect of the present invention has a comparatively low viscosity and an excellent storage stability while showing sealing properties equivalent to those of a conventional tire puncture sealant, when the synthetic resin emulsion is at least one emulsion selected from the group consisting of a urethane emulsion, an acrylic emulsion, a polyolefin emulsion, an ethylene-vinyl acetate emulsion, a vinyl acetate emulsion, and a polyvinyl chloride emulsion.

Next, the tire puncture sealant in the fifth aspect of the present invention will be described.

The tire puncture sealant in the fifth aspect of the present invention includes a chloroprene emulsion and an antifreezing agent and has a hydrogen ion exponent (pH) of less than 9.0.

The chloroprene emulsion that may be used in the tire puncture sealant of the fifth aspect of the present invention is not particularly limited but any known chloroprene emulsion may be used.

An emulsion obtained by emulsion polymerizing, for example, a chloroprene monomer and an anionic group-containing vinyl monomer, and optionally a copolymerizable ethylenically unsaturated monomer is preferably used for the chloroprene emulsion.

The term "anionic group" as used herein refers to a group that may be negatively charged by neutralization with a base. Specific examples of the anionic group that may be preferably used include carboxy group, sulfo group and phosphate group, and carboxy group is more preferable.

Specific examples of the anionic group-containing vinyl monomer include unsaturated fatty acids such as acrylic acid, methacrylic acid, fumaric acid, maleic acid, and crotonic acid; and styrene sulfonic acid. These may be used alone or in combination of two or more. Of these, methacrylic acid is preferable.

The anionic group-containing vinyl monomer is used in an amount of preferably 0.1 to 20 parts by weight and more preferably 1 to 15 parts by weight with respect to 100 parts by weight of the chloroprene monomer.

Specific examples of the copolymerizable ethylenically unsaturated monomer include ethylene, styrene, methyl methacrylate, acrylonitrile, 2,3-dichlorobutadiene, and 1-chlorobutadiene.

The copolymerizable ethylenically unsaturated monomer is preferably used in an amount of 20 parts by weight or less with respect to 100 parts by weight of the chloroprene monomer.

The emulsion polymerization may be carried out by any conventionally known method, and a specific example thereof includes a method in which water, the above-mentioned monomers, an emulsifying dispersant, a polymerization initiator, a chain transfer agent, and the like are mixed for polymerization. A polymerization terminator may also be added to the mixture at a point in time when a predetermined degree of conversion is reached.

The polymerization can be generally carried out at a temperature of 0 to 80° C. and preferably 5 to 50° C.

The emulsifying dispersant is not particularly limited but any known emulsifying dispersant may be used, and specific examples thereof include alkali metal salts of rosin acid, sulfonic acid type or sulfuric acid ester type anionic emulsifiers, and nonionic emulsifiers. More specific examples of the emulsifying dispersant include alkyl sulfonate, alkylaryl sulfonate, alkyl sulfate, alkylaryl sulfate, a condensation product of sodium naphthalenesulfonate with formaldehyde, polyoxyethylene alkyl ether, polyoxyethylene alkyl phenol, sorbitan fatty acid ester, and polyoxyethylene acyl ester.

When the chloroprene monomer and the carboxy group-containing vinyl monomer are emulsion polymerized under acidic conditions, alkali metal salt and triethanolamine salt of alkyl diphenyl ether disulfonic acid, alkali metal salt and triethanolamine salt of dodecylbenzenesulfonic acid, and alkali metal salt and triethanolamine salt of lauryl sulfate are preferably used.

The amount of emulsifying dispersant to be added is preferably 0.1 to 10 parts by weight with respect to 100 parts by weight of monomer charged in order to stably carrying out emulsion polymerization.

Examples of the polymerization initiator include known free radical-producing substances including persulfates such as potassium persulfate and ammonium persulfate; and inorganic or organic peroxides such as hydrogen peroxide and t-butyl hydroperoxide.

Specific examples of the chain transfer agent include alkyl mercaptan, halogenated hydrocarbon, alkyl xanthogen disulfide, and sulfur.

Specific examples of the polymerization terminator include phenothiazine, 2,6-t-butyl-4-methylphenol, and hydroxylamine.

It is preferable for another emulsifying dispersant to be incorporated in addition to the one used at the time of the emulsion polymerization in order to improve the stability of the chloroprene emulsion.

Based on the timing at which the additional emulsifying dispersant is incorporated, there are three methods including a method in which the additional emulsifying dispersant is also incorporated when the material is charged for the polymerization, a method in which the additional emulsifying dispersant is incorporated during the polymerization, and a method in which the additional emulsifying dispersant is incorporated at the end of the polymerization. Although not specifically limited, it is preferable that the additional emulsifying dispersant is incorporated when the degree of conversion reaches 50 to 90% during the polymerization.

Next, the antifreezing agent will be described.

Specific examples of the antifreezing agent that may be preferably used in the tire puncture sealant of the fifth aspect of the present invention include ethylene glycol and propylene glycol. These may be used alone or in combination of two or more.

The content of the antifreezing agent is preferably 100 to 400 parts by weight, more preferably 120 to 350 parts by weight, and still more preferably 140 to 350 parts by weight with respect to 100 parts by weight of the solid content of the chloroprene emulsion in terms of preventing the tire puncture sealant from freezing and maintaining stability thereof.

The solid content of the chloroprene emulsion as used herein refers to the total amount of the respective components in the chloroprene emulsion with the exclusion of water and a solvent.

It is preferable for the tire puncture sealant in the fifth aspect of the present invention to further include a tackifier in terms of obtaining excellent sealing properties.

Those illustrated for use in the tire puncture sealant of the first aspect of the present invention may be used for the tackifier.

The solid content of the tackifier is preferably 50 to 250 parts by weight, more preferably 70 to 180 parts by weight, and still more preferably 70 to 150 parts by weight with respect to 100 parts by weight of the solid content of the chloroprene emulsion in terms of its excellent sealing properties.

The solid content of the tackifier as used herein refers to the total amount of the respective components in the tackifier with the exclusion of water and a solvent.

In addition to the respective components as described above, the tire puncture sealant in the fifth aspect of the present invention may contain as desired any of various additives including a filler, an antiaging agent, an antioxidant, a pigment (dye), a plasticizer, a thixotropic agent, a UV absorber, a flame retardant, a dispersant, a dehydrating agent, and an antistatic agent.

Those illustrated for use in the tire puncture sealant of the first aspect of the present invention may be used for the above-mentioned various additives.

The tire puncture sealant in the fifth aspect of the present invention has a pH of less than 9.0. When the pH is within this range, the tire puncture sealant can have sealing properties equivalent to those of a conventional tire puncture sealant. At a pH of less than 9.0, the content of ammonia that may cause odor is comparatively low, so pungent odor may be suppressed. The tire puncture sealant in the fifth aspect of the present invention preferably has a pH of 8.5 or less and more preferably 5.5 to 8.5 in terms of having these excellent properties and hardly rusting steel tire cord.

The tire puncture sealant in the fifth aspect of the present invention preferably has a pH of 7.5 or more and more preferably 8.0 or more in terms of its sufficient storage stability to enable the sealant to be stored in a car for a long period of time.

The method of producing the tire puncture sealant in the fifth aspect of the present invention is not particularly limited but may be, for example, a method in which the chloroprene emulsion and the antifreezing agent, and optionally the tackifier and any of the various additives are incorporated in a reaction vessel and then sufficiently mixed under reduced pressure with a stirring device such as a blender.

In a preferred embodiment of the tire puncture sealant according to the fifth aspect of the present invention, an acid is used to lower the hydrogen ion exponent. For example, most of the commercially available chloroprene emulsions are strongly alkaline, so when a commercially available chloroprene emulsion is used, the resulting tire puncture sealant may have a pH of 9.0 or more. In this case, an acid is added to lower the pH to the above-mentioned range.

The timing of acid addition is not specifically limited, but an acid may be preliminarily added to the chloroprene emulsion, the tackifier, water, or the like. Alternatively, an acid may be added during the mixture of the chloroprene emulsion, the antifreezing agent and the optional components, or after these components have been mixed.

Specific examples of the acid include, but are not particularly limited to, inorganic acids such as hydrochloric acid, sulfuric acid, nitric acid, phosphoric acid, and phosphorous acid; and organic acids such as acetic acid, propionic acid, formic acid, butyric acid, lactic acid, malic acid, and citric acid. These may be used alone or in combination of two or more.

The usage of the tire puncture sealant in the fifth aspect of the present invention is the same as that of the tire puncture sealant in the first aspect of the present invention.

The tire puncture sealant in the fifth aspect of the present invention has a comparatively low viscosity and a less odor, while showing sealing properties equivalent to those of a conventional tire puncture sealant. In addition, the tire puncture sealant is excellent in storage stability and the like, and can be kept in a car for a long period of time when the tire puncture sealant has a pH of 7.5 or more. Further, steel tire cord is hardly rusted when the tire puncture sealant has a pH of 5.5 to 8.5.

EXAMPLES

Hereinafter, the present invention will be specifically described by way of examples. However, the present invention is not limited to these examples.

1. Examples of the Tire Puncture Sealant in the First Aspect of the Present Invention Preparation of Urethane Emulsion Synthetic Examples 1-1 to 1-5

The respective components of (A) listed in Table 1 below were mixed in amounts (g) shown in Table 1, to thereby synthesize each of carboxy group-containing urethane prepolymers.

Next, the respective components of (B) listed in Table 1 below were added to each of the carboxy group-containing urethane prepolymers in amounts (g) shown in Table 1. The mixture was emulsified with sufficient stirring to prepare each of urethane emulsions in Synthetic Examples 1-1 to 1-5.

The hydrogen ion exponent of each of the resulting urethane emulsions was measured with a pH meter (manufactured by Hitachi High-Technologies Corporation, hereinafter same as this). The results are shown in Table 1.

TABLE 1

|  |  | Synthetic Example 1-1 | Synthetic Example 1-2 | Synthetic Example 1-3 | Synthetic Example 1-4 | Synthetic Example 1-5 |
| --- | --- | --- | --- | --- | --- | --- |
| (A) | Tolylene diisocyanate | 62 | 62 | 62 | 62 | 62 |
|  | Polypropylene glycol | 251 |  |  |  |  |
|  | Polytetramethylene glycol |  | 251 |  |  |  |
|  | Polycaprolactone diol |  |  | 251 |  |  |
|  | Polycarbonate diol |  |  |  | 251 |  |
|  | Castor oil polyol |  |  |  |  | 156 |
|  | Dimethylol butanoic acid | 10.5 | 10.5 | 10.5 | 10.5 | 10.5 |
|  | Ethyl acetate | 400 | 400 | 400 | 400 | 250 |
| (B) | Triethylamine | 7.7 | 7.7 | 7.7 | 7.7 | 7.7 |
|  | Piperazine hexahydrate | 4.0 | 4.0 | 4.0 | 4.0 | 4.0 |
|  | Distilled water | 400 | 400 | 400 | 400 | 281 |

TABLE 1-continued

|  | Synthetic Example 1-1 | Synthetic Example 1-2 | Synthetic Example 1-3 | Synthetic Example 1-4 | Synthetic Example 1-5 |
|---|---|---|---|---|---|
| Hydrogen ion exponent (pH) | 7.5 | 7.5 | 7.5 | 7.5 | 7.5 |
| Solid content of urethane emulsion (wt %) | 45.6 | 45.6 | 45.6 | 45.6 | 45.6 |

The respective components listed in Table 1 are as follows:

Tolylene diisocyanate: Cosmonate T-80, manufactured by Mitsui Takeda Chemicals, Inc.;

Polypropylene glycol: Diol-2000, manufactured by Mitsui Takeda Chemicals, Inc., with a number average molecular weight ($M_n$) of 2,000;

Polytetramethylene glycol: PTMG2000, manufactured by Mitsubishi Chemical Corporation, with an $M_n$ of 2,000;

Polycaprolactone diol: PLACCEL 220, manufactured by Daicel Chemical Industries, Ltd., with an $M_n$ of 2,000;

Polycarbonate diol: PLACCEL CD220, manufactured by Daicel Chemical Industries, Ltd., with an $M_n$ of 2,000;

Castor oil polyol: Uric H56, manufactured by Itoh Oil Chemicals Co., Ltd., with an $M_n$ of 1,250;

Dimethylol butanoic acid: Nikkamer BA, manufactured by Nippon Kasei Chemical Co., Ltd.;

Ethyl acetate: manufactured by Wako Pure Chemical Industries, Ltd.;

Triethylamine: manufactured by Wako Pure Chemical Industries, Ltd.;

Piperazine hexahydrate: manufactured by Nippon Nyukazai Co., Ltd.

Preparation of NBR Latex Tire Puncture Sealant (Formulation Example 1-1)

An NBR latex tire puncture sealant was prepared according to the method of Example 1 described in JP 2005-170973 A.

Specifically, materials (1) to (5) described below:

(1) Rubber latex: NBR latex (Nipol, manufactured by Zeon Corporation), content in the puncture sealant: 65% by weight;

(2) Nylon fiber: content in the puncture sealant: 2% by weight, fiber length: 2 to 7 mm, fiber thickness: 5 to 30 μm;

(3) Antifreezing agent: ethylene glycol, content in the puncture sealant: 25% by weight;

(4) Thickener: smectite clay, content in the puncture sealant: 2% by weight; and (5) Others: water as the balance were mixed using a stirring device to obtain an NBR latex tire puncture sealant of Formulation Example 1-1 (pH 9.5).

Examples 1-1 to 1-26 and Comparative Examples 1-1 and 1-2

The respective components listed in Table 2 below were mixed in compositions (parts by weight) shown in Table 2 with a stirring device, thereby preparing the respective tire puncture sealants shown in Table 2.

The hydrogen ion exponent of each of the tire puncture sealants thus obtained was measured with a pH meter. Each tire puncture sealant was evaluated for the rustproof properties, odor, freezing point, sealing properties, thermal shock cycle stability, shaking test, storage stability, liquid supply properties, and air supply properties.

The results are shown in Table 2.

(Rustproof Properties)

Each tire puncture sealant was applied onto the surface of a steel plate having been degreased with methyl ethyl ketone, and then left standing for 24 hours at 20° C. to be dried. Subsequently, the steel plate was immersed in hot water at 50° C. and left standing for 7 days. After that, the sealant was peeled off of the steel plate and the surface of the steel plate was visually observed to check whether or not the plate surface was rusted.

A non-rusted plate was rated as "good", whereas a rusted plate was rated as "poor".

(Odor)

Whether or not each tire puncture sealant had odor was checked.

A sealant having no odor was rated as "good", whereas a sealant having a strong odor was rated as "poor".

(Freezing Point)

The freezing point of the tire puncture sealant was determined using a differential scanning calorimeter (DSC, manufactured by TA Instruments, Inc.).

(Sealing Properties)

A tire tread part was cut into a sample with a length of 15 cm and a width of 22 cm, which was then perforated with a nail having a diameter of 5 mm.

Assuming here that a tire puncture sealant was injected into the tire, 50 g of each tire puncture sealant was dripped into the hole from the backside (inside of the tire) of the tread in an environment of 20° C. and 65% RH.

Then, the periphery of the hole was hit 5 times with a wooden hammer from the tread side in order to promote film formation.

The sample was left standing for 20 minutes in the environment of 20° C. and 65% RH, and water was then sprayed onto the hole from the tread side to check whether or not water leaked to the backside (inside).

A sample having no water leakage was rated as "good", whereas a sample having water leakage was rated "poor".

(Thermal Shock Cycle Stability)

Each of the tire puncture sealants was subjected to ten cycles of cooling at −20° C. for 8 hours and subsequent heating at 80° C. for 16 hours. Thereafter, how the tire puncture sealant components were dispersed was visually observed. A sealant which caused no sedimentation but was in a uniformly dispersed state was rated as "good", whereas a sealant having aggregates or films formed therein was rated as "fair".

(Shaking Test)

A glass bottle containing 200 g of the sealant was hermetically sealed. Then, the glass bottle was shaken at a frequency of 1 to 5 Hz for 60 hours in an environment of 70° C.

Thereafter, how the sealant components were dispersed was visually observed. A sealant having no sedimentation or separation was rated as "good", whereas a sealant having aggregates or films formed therein was rated as "fair".

(Storage Stability)

The resulting tire puncture sealant was placed in a vessel, which was then purged with nitrogen, hermetically sealed and left standing at 80° C. for 100 days. Thereafter, the state of the tire puncture sealant was observed and how the sealant components were dispersed was visually checked. A sealant having no sedimentation or separation was rated as "good", whereas a sealant having aggregates or films formed therein was rated as "fair".

(Liquid Supply Properties)

A compressor which received power (12 V) from a cigarette lighter was mounted on a plastic vessel containing 500 ml of the resulting tire puncture sealant. A nozzle was then attached to a valve of a tire. Subsequently, the sealant was fed into the tire at ordinary temperature at a pressure of 0.5 MPa, and the time(s) required for feeding the whole sealant in the plastic vessel into the tire was measured.

(Air Supply Properties)

After evaluating the liquid supply properties, air was continuously supplied into the tire at ordinary temperature and the time(s) required until the pressure gauge of the compressor indicated a pressure of 0.3 MPa was then measured.

TABLE 2

| | Example | | | | | | | | | | | |
|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 |
| Urethane emulsion (Synthetic Example 1-1) | 100 | 100 | 100 | 100 | | | | | 100 | 100 | | |
| Urethane emulsion (Synthetic Example 1-2) | | | | | 100 | 100 | 100 | 100 | | | 100 | 100 |
| Tackifier | 100 | 100 | 100 | 150 | 100 | 100 | 100 | 150 | 80 | 80 | 80 | 80 |
| Antifreezing agent | 100 | 150 | 70 | 70 | 100 | 150 | 70 | 70 | 50 | 200 | 50 | 200 |
| pH | 7.5 | 7.5 | 7.5 | 7.0 | 8.0 | 7.5 | 8.0 | 8.0 | 7.0 | 7.0 | 7.0 | 7.0 |
| Rustproof properties | Good | Good | Good | Good | Good | Good | Good | Good | Good | Good | Good | Good |
| Odor | Good | Good | Good | Good | Good | Good | Good | Good | Good | Good | Good | Good |
| Freezing point (° C.) | −39 | −41 | −38 | −39 | −38 | −39 | −39 | −40 | −11 | −42 | −10 | −40 |
| Sealing properties | Good | Good | Good | Good | Good | Good | Good | Good | Good | Good | Good | Good |
| Thermal shock cycle stability | Good | Good | Good | Good | Good | Good | Good | Good | Fair | Good | Fair | Good |
| Shaking test (70° C.) | Good | Good | Good | Good | Good | Good | Good | Good | Good | Fair | Good | Fair |
| Storage stability (80° C. × 100 days) | Good | Good | Good | Good | Good | Good | Good | Good | Good | Good | Good | Good |
| Liquid supply properties (s) | 45 | 50 | 50 | 40 | 40 | 35 | 30 | 35 | 40 | 50 | 45 | 40 |
| Air supply properties (s) | 220 | 220 | 240 | 240 | 210 | 220 | 190 | 190 | 195 | 190 | 210 | 190 |

| | Example | | | | | | | | | | | | | | Comparative Example | |
|---|---|---|---|---|---|---|---|---|---|---|---|---|---|---|---|---|
| | 1-13 | 1-14 | 1-15 | 1-16 | 1-17 | 1-18 | 1-19 | 1-20 | 1-21 | 1-22 | 1-23 | 1-24 | 1-25 | 1-26 | 1-1 | 1-2 |
| Urethane emulsion (Synthetic Example 1-3) | 100 | 100 | 100 | 100 | | | | | | | | | 100 | 100 | | |
| Urethane emulsion (Synthetic Example 1-4) | | | | | 100 | 100 | 100 | 100 | | | | | | | | |
| Urethane emulsion (Synthetic Example 1-5) | | | | | | | | | 100 | 100 | 100 | 100 | | | | |
| Natural rubber latex | | | | | | | | | | | | | | | 100 | |
| Formulation Example 1-1 (NBR tire puncture sealant) | | | | | | | | | | | | | | | | 100 |
| Tackifier | 100 | 100 | 100 | 150 | 100 | 100 | 100 | 150 | 100 | 100 | 100 | 150 | 100 | 100 | 80 | |
| Antifreezing agent | 100 | 150 | 70 | 70 | 100 | 150 | 70 | 70 | 100 | 150 | 70 | 70 | 70 | 70 | 70 | |
| Hydrochloric acid | | | | | | | | | | | | | 1.2 | | | |
| Triethylamine | | | | | | | | | | | | | | 0.9 | | 0.9 |
| pH | 7.0 | 7.5 | 7.5 | 7.0 | 7.5 | 7.5 | 8.0 | 8.0 | 7.5 | 7.5 | 7.0 | 7.5 | 5.5 | 8.5 | 9.0 | 9.5 |
| Rustproof properties | Good | Good | Good | Good | Good | Good | Good | Good | Good | Good | Good | Good | Good | Good | Poor | Poor |
| Odor | Good | Good | Good | Good | Good | Good | Good | Good | Good | Good | Good | Good | Good | Good | Poor | Poor |
| Freezing point (° C.) | −40 | −40 | −38 | −42 | −38 | −40 | −39 | −41 | −40 | −40 | −39 | −38 | −39 | −38 | −38 | −40 |
| Sealing properties | Good | Good | Good | Good | Good | Good | Good | Good | Good | Good | Good | Good | Good | Good | Good | Good |
| Thermal shock cycle stability | Good | Good | Good | Good | Good | Good | Good | Good | Good | Good | Good | Good | Good | Good | Good | Fair |
| Shaking test (70° C.) | Good | Good | Good | Good | Good | Good | Good | Good | Good | Good | Good | Good | Good | Good | Fair | Good |
| Storage stability (80° C. × 100 days) | Good | Good | Good | Good | Good | Good | Good | Good | Good | Good | Good | Good | Good | Good | Fair | Good |
| Liquid supply properties (s) | 35 | 40 | 35 | 45 | 45 | 40 | 30 | 45 | 30 | 25 | 30 | 45 | 35 | 40 | 30 | 300 |
| Air supply properties (s) | 210 | 200 | 190 | 190 | 190 | 190 | 240 | 240 | 200 | 210 | 230 | 240 | 200 | 200 | 220 | >300 |

The respective components listed in Table 2 are as follows:

Natural rubber latex: HA, manufactured by Golden Hope Plantation Berhad Co., Ltd., solid content: 60% by weight, pH 11.5;

Tackifier: HARIESTER SK508, manufactured by Harima Chemicals, Inc., solid content: 54% by weight, pH 6.5;

Antifreezing agent (ethylene glycol): manufactured by Wako Pure Chemical Industries, Ltd., solid content: 100% by weight;

Hydrochloric acid: manufactured by Wako Pure Chemical Industries, Ltd.;

Triethylamine: manufactured by Wako Pure Chemical Industries, Ltd.

As is evident from the results shown in Table 2, the natural rubber latex tire puncture sealant (Comparative Example 1-1) had a high pH value and caused rust and pungent odor, while showing low storage stability. In addition, the NBR tire puncture sealant (Comparative Example 1-2) had a high pH value and caused rust and pungent odor, while having low liquid supply properties and air supply properties.

In contrast, Examples 1-1 to 1-26 showed sealing properties equivalent to those in Comparative Examples 1-1 and 1-2, together with excellent storage stability, liquid supply properties and air supply properties. Further, there was no rust or odor.

2. Examples of the Tire Puncture Sealant in the Second Aspect of the Present Invention Synthesis of Acrylic Emulsion Synthetic Example 2-1

Monomers, a surfactant (polyoxyethylene lauryl ether), and a polymerization initiator (t-butylhydroxy peroxide) listed in Table 3 below were mixed together in amounts (parts by weight) shown in Table 3. The mixture was added to 60 parts by weight of ion-exchange water and stirred at room temperature for about 10 minutes to obtain a milky monomer emulsified liquid.

Previously, 10 parts by weight of ion-exchange water was fed to a reaction vessel and heated to 70° C. Then, the resulting monomer emulsified liquid was added dropwise over 1 hour to the reaction vessel. Thereafter, the reaction was allowed to proceed at 70° C. for 4 hours to obtain an acrylic emulsion.

TABLE 3

|  | Synthetic Example 2-1 |
|---|---|
| 2-ethylhexyl methacrylate | 20 |
| Methacrylic acid | 10 |
| Butyl methacrylate | 40 |
| Polyoxyethylene lauryl ether | 0.5 |
| t-butylhydroxy peroxide | 1 |
| Ion-exchange water | 70 |

The respective components listed in Table 3 are as follows:
2-ethylhexyl methacrylate: LIGHT-ESTER EH, manufactured by Kyoeisha Chemical Co., Ltd.;
Methacrylic acid: LIGHT-ESTER A, manufactured by Kyoeisha Chemical Co., Ltd.;
Butyl methacrylate: LIGHT-ESTER NB, manufactured by Kyoeisha Chemical Co., Ltd.;
Polyoxyethylene lauryl ether: EMULGEN 103, manufactured by Kao Corporation;
t-butylhydroxy peroxide: PERBUTYL 69, manufactured by NOF Corporation.

Preparation of NBR Latex Tire Puncture Sealant (Formulation Example 2-1)

An NBR latex tire puncture sealant was prepared according to the method of Example 1 described in JP 2005-170973 A.
Specifically, materials (1) to (5) described below:
(1) Rubber latex: NBR latex (Nipol, manufactured by Zeon Corporation), content in the puncture sealant: 65% by weight;
(2) Nylon fiber: content in the puncture sealant: 2% by weight, fiber length: 2 to 7 mm, fiber thickness: 5 to 30 μm;
(3) Antifreezing agent: ethylene glycol, content in the puncture sealant: 25% by weight;
(4) Thickener: smectite clay, content in the puncture sealant: 2% by weight; and
(5) Others: water as the balance were mixed using a stirring device to obtain an NBR latex tire puncture sealant of Formulation Example 2-1 (pH 9.5).

Examples 2-1 to 2-14 and Comparative Examples 2-1 and 2-2

The respective components listed in Table 4 below were mixed in compositions (parts by weight) shown in Table 4 with a stirring device, thereby preparing the respective tire puncture sealants shown in Table 4.

The hydrogen ion exponent of each of the tire puncture sealants thus obtained was measured with a pH meter. Each tire puncture sealant was evaluated in the same manner as above for the rustproof properties, odor, freezing point, sealing properties, thermal shock cycle stability, shaking test, storage stability, liquid supply properties, and air supply properties.

The results are shown in Table 4.

TABLE 4

|  | Example | | | | | | | | | | | | | | Comparative Example | |
|---|---|---|---|---|---|---|---|---|---|---|---|---|---|---|---|---|
|  | 2-1 | 2-2 | 2-3 | 2-4 | 2-5 | 2-6 | 2-7 | 2-8 | 2-9 | 2-10 | 2-11 | 2-12 | 2-13 | 2-14 | 2-1 | 2-2 |
| Acrylic emulsion 1 | 100 | 100 | 100 | 100 |  |  |  |  | 100 | 100 |  |  |  |  |  |  |
| Acrylic emulsion 2 |  |  |  |  | 100 | 100 | 100 | 100 |  |  | 100 | 100 | 100 | 100 |  |  |
| Natural rubber latex |  |  |  |  |  |  |  |  |  |  |  |  |  |  | 100 |  |
| Formulation Example 2-1 (NBR tire puncture sealant) |  |  |  |  |  |  |  |  |  |  |  |  |  |  |  | 100 |
| Tackifier | 100 | 100 | 100 | 150 | 150 | 150 | 150 | 150 | 80 | 80 | 80 | 80 | 150 | 150 | 80 |  |
| Antifreezing agent | 100 | 150 | 70 | 70 | 100 | 150 | 70 | 70 | 50 | 200 | 50 | 200 | 100 | 100 | 70 |  |
| Hydrochloric acid |  |  |  |  |  |  |  |  |  |  |  |  | 2.1 |  |  |  |
| Triethylamine |  |  |  |  |  |  |  |  |  |  |  |  |  | 1.8 |  |  |
| pH | 7.5 | 7.5 | 7.5 | 7.0 | 8.0 | 7.5 | 8.0 | 8.0 | 7.0 | 7.0 | 7.0 | 7.0 | 5.5 | 8.5 | 9.0 | 9.5 |
| Rustproof properties | Good | Good | Good | Good | Good | Good | Good | Good | Good | Good | Good | Good | Good | Good | Poor | Poor |
| Odor | Good | Good | Good | Good | Good | Good | Good | Good | Good | Good | Good | Good | Good | Good | Poor | Poor |
| Freezing point (° C.) | −35.2 | −38.0 | −36.5 | −36.0 | −41.0 | −41.0 | −40.0 | −40.0 | −12.5 | −40.0 | −11.0 | −42.0 | −39.0 | −40.0 | −38 | −40 |

TABLE 4-continued

|  | Example | | | | | | | | | | | | | | Comparative Example | |
|---|---|---|---|---|---|---|---|---|---|---|---|---|---|---|---|---|
|  | 2-1 | 2-2 | 2-3 | 2-4 | 2-5 | 2-6 | 2-7 | 2-8 | 2-9 | 2-10 | 2-11 | 2-12 | 2-13 | 2-14 | 2-1 | 2-2 |
| Sealing properties | Good | Good | Good | Good | Good | Good | Good | Good | Good | Good | Good | Good | Good | Good | Good | Good |
| Thermal shock cycle stability | Good | Good | Good | Good | Good | Good | Good | Good | Fair | Good | Fair | Good | Good | Good | Good | Fair |
| Shaking test (70° C.) | Good | Good | Good | Good | Good | Good | Good | Good | Good | Fair | Good | Fair | Good | Good | Fair | Good |
| Storage stability (80° C. × 100 days) | Good | Good | Good | Good | Good | Good | Good | Good | Good | Good | Good | Good | Good | Good | Fair | Good |
| Liquid supply properties (s) | 35 | 40 | 30 | 35 | 40 | 40 | 35 | 35 | 30 | 30 | 35 | 30 | 45 | 50 | 30 | 300 |
| Air supply properties (s) | 200 | 220 | 200 | 195 | 220 | 210 | 195 | 195 | 190 | 195 | 200 | 195 | 210 | 220 | 220 | >300 |

The respective components listed in Table 4 are as follows:

Acrylic emulsion 1: Acronal A378, manufactured by BASF, solid content: 50% by weight, pH 8.0;

Acrylic emulsion 2: Acrylic emulsion of Synthetic Example 2-1, solid content: 50% by weight, pH 8.0;

Natural rubber latex: HA, manufactured by Golden Hope Plantation Berhad Co., Ltd., solid content: 60% by weight, pH 11.5;

Tackifier: HARIESTER SK508, manufactured by Harima Chemicals, Inc., solid content: 54% by weight, pH 6.5;

Antifreezing agent (ethylene glycol): manufactured by Wako Pure Chemical Industries, Ltd., solid content: 100% by weight;

Hydrochloric acid: manufactured by Wako Pure Chemical Industries, Ltd.;

Triethylamine: manufactured by Wako Pure Chemical Industries, Ltd.

As is evident from the results shown in Table 4, the natural rubber latex tire puncture sealant (Comparative Example 2-1) had a high pH value and caused rust and pungent odor, while showing low storage stability. In addition, the NBR tire puncture sealant (Comparative Example 2-2) had a high pH value and caused rust and pungent odor, while having low liquid supply properties and air supply properties.

In contrast, Examples 2-1 to 2-14 showed sealing properties equivalent to those in Comparative Examples 2-1 and 2-2, together with excellent storage stability, liquid supply properties and air supply properties. Further, there was no rust or odor.

3. Examples of the Tire Puncture Sealant in the Third Aspect of the Present Invention Preparation of NBR Latex Tire Puncture Sealant Formulation Example 3-1

An NBR latex tire puncture sealant was prepared according to the method of Example 1 described in JP 2005-170973 A.

Specifically, materials (1) to (5) described below:

(1) Rubber latex: NBR latex (Nipol, manufactured by Zeon Corporation), content in the puncture sealant: 65% by weight;

(2) Nylon fiber: content in the puncture sealant: 2% by weight, fiber length: 2 to 7 mm, fiber thickness: 5 to 30 µm;

(3) Antifreezing agent: ethylene glycol, content in the puncture sealant: 25% by weight;

(4) Thickener: smectite clay, content in the puncture sealant: 2% by weight; and (5) Others: water as the balance were mixed using a stirring device to obtain an NBR latex tire puncture sealant of Formulation Example 3-1 (pH 9.5).

Examples 3-1 to 3-32 and Comparative Examples 3-1 and 3-2

The respective components listed in Table 5 below were mixed in compositions (parts by weight) shown in Table 5 with a stirring device, thereby preparing the respective tire puncture sealants shown in Table 5.

The hydrogen ion exponent of each of the tire puncture sealants thus obtained was measured with a pH meter. Each tire puncture sealant was evaluated in the same manner as above for the rustproof properties, odor, freezing point, sealing properties, thermal shock cycle stability, shaking test, storage stability, liquid supply properties, and air supply properties.

The results are shown in Table 5.

TABLE 5

|  | Example | | | | | | | | | | | | | | | | | |
|---|---|---|---|---|---|---|---|---|---|---|---|---|---|---|---|---|---|---|
|  | 3-1 | 3-2 | 3-3 | 3-4 | 3-5 | 3-6 | 3-7 | 3-8 | 3-9 | 3-10 | 3-11 | 3-12 | 3-13 | 3-14 | 3-15 | 3-16 | 3-17 | 3-18 |
| Polyethylene emulsion 1 | 100 | 100 | 100 | 100 |  |  |  |  |  |  |  |  | 100 | 100 |  |  | 100 | 100 |
| Polyethylene emulsion 2 |  |  |  |  | 100 | 100 | 100 | 100 |  |  |  |  |  |  | 100 | 100 |  |  |
| Polypropylene emulsion |  |  |  |  |  |  |  |  | 100 | 100 | 100 | 100 |  |  |  |  |  |  |

TABLE 5-continued

| | | | | | | | | | | | | | | | | | | |
|---|---|---|---|---|---|---|---|---|---|---|---|---|---|---|---|---|---|---|
| Tackifier | 100 | 100 | 100 | 150 | 150 | 150 | 150 | 150 | 150 | 150 | 150 | 150 | 80 | 80 | 80 | 80 | 150 | 150 |
| Antifreezing agent | 100 | 150 | 70 | 70 | 100 | 150 | 70 | 70 | 100 | 150 | 70 | 70 | 50 | 200 | 50 | 200 | 70 | 70 |
| Hydrochloric acid | | | | | | | | | | | | | | | | | 1.2 | |
| Triethylamine | | | | | | | | | | | | | | | | | | 0.9 |
| pH | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 5.5 | 8.5 |
| Rustproof properties | Good | Good | Good | Good | Good | Good | Good | Good | Good | Good | Good | Good | Good | Good | Good | Good | Good | Good |
| Odor | Good | Good | Good | Good | Good | Good | Good | Good | Good | Good | Good | Good | Good | Good | Good | Good | Good | Good |
| Freezing point (°) | −40 | −41 | −41 | −39 | −43 | −41 | −41 | −40 | −43 | −41 | −40 | −43 | −11 | −38 | −12 | −39 | −41 | −37 |
| Sealing properties | Good | Good | Good | Good | Good | Good | Good | Good | Good | Good | Good | Good | Good | Good | Good | Good | Good | Good |
| Thermal shock cycle stability | Good | Good | Good | Good | Good | Good | Good | Good | Good | Good | Good | Good | Fair | Good | Fair | Good | Good | Good |
| Shaking test (70° C.) | Good | Good | Good | Good | Good | Good | Good | Good | Good | Good | Good | Good | Good | Fair | Good | Fair | Good | Good |
| Storage stability (8000 × 100 days) | Good | Good | Good | Good | Good | Good | Good | Good | Good | Good | Good | Good | Good | Good | Good | Good | Good | Good |
| Liquid supply properties (s) | 45 | 35 | 30 | 50 | 45 | 35 | 35 | 40 | 35 | 45 | 30 | 35 | 50 | 45 | 35 | 25 | 40 | 35 |
| Air supply properties (s) | 195 | 190 | 200 | 210 | 190 | 185 | 195 | 210 | 195 | 180 | 215 | 215 | 200 | 195 | 215 | 195 | 200 | 195 |

| | Example | | | | | | | | | | | | | | Comparative Example | |
|---|---|---|---|---|---|---|---|---|---|---|---|---|---|---|---|---|
| | 3-19 | 3-20 | 3-21 | 3-22 | 3-23 | 3-24 | 3-25 | 3-26 | 3-27 | 3-28 | 3-29 | 3-30 | 3-31 | 3-32 | 3-1 | 3-2 |
| Polybutene emulsion 1 | 100 | 100 | 100 | 100 | | | | | 100 | 100 | | | 100 | 100 | | |
| Polybutene emulsion 2 | | | | | 100 | 100 | 100 | 100 | | | 100 | 100 | | | | |
| Natural rubber latex | | | | | | | | | | | | | | | 100 | |
| Formulation Example 3-1 (NBR tire puncture sealant) | | | | | | | | | | | | | | | | 100 |
| Tackifier | 100 | 100 | 100 | 150 | 150 | 150 | 150 | 150 | 80 | 80 | 80 | 80 | 150 | 150 | 80 | |
| Antifreezing agent | 100 | 150 | 70 | 70 | 100 | 150 | 70 | 70 | 50 | 200 | 50 | 200 | 70 | 70 | 70 | |
| Hydrochloric acid | | | | | | | | | | | | | 1.2 | | | |
| Triethylamine | | | | | | | | | | | | | | 1.0 | | |
| pH | 7.0 | 7.0 | 7.0 | 7.0 | 7.0 | 7.0 | 7.0 | 7.0 | 7.0 | 7.0 | 7.0 | 7.0 | 5.5 | 8.5 | 9.0 | 9.5 |
| Rustproof properties | Good | Good | Good | Good | Good | Good | Good | Good | Good | Good | Good | Good | Good | Good | Poor | Poor |
| Odor | Good | Good | Good | Good | Good | Good | Good | Good | Good | Good | Good | Good | Good | Good | Poor | Poor |
| Freezing point (° C.) | −40 | −41 | −41 | −39 | −43 | −41 | −41 | −40 | −9 | −40 | −12 | −39 | −38 | −40 | −38 | −40 |
| Sealing properties | Good | Good | Good | Good | Good | Good | Good | Good | Good | Good | Good | Good | Good | Good | Good | Good |
| Thermal shock cycle stability | Good | Good | Good | Good | Good | Good | Good | Good | Fair | Good | Fair | Good | Good | Good | Good | Fair |
| Shaking test (70° C.) | Good | Good | Good | Good | Good | Good | Good | Good | Good | Fair | Good | Fair | Good | Good | Fair | Good |
| Storage stability (80° C. × 100 days) | Good | Good | Good | Good | Good | Good | Good | Good | Good | Good | Good | Good | Good | Good | Fair | Good |
| Liquid supply properties (s) | 40 | 35 | 40 | 35 | 40 | 40 | 30 | 45 | 40 | 35 | 50 | 40 | 40 | 35 | 30 | 300 |
| Air supply properties (s) | 210 | 205 | 200 | 215 | 195 | 180 | 210 | 195 | 200 | 190 | 215 | 185 | 220 | 210 | 220 | >300 |

The respective components listed in Table 5 are as follows:
Polyethylene emulsion 1: Nopcoat PEM-17, manufactured by San Nopco Ltd., solid content: 40% by weight, pH 7.0;
Polyethylene emulsion 2: PE 401, manufactured by Naruse Chemical Co., Ltd., solid content: 60% by weight, pH 7.0;
Polypropylene emulsion: PP emulsion, manufactured by Maruyoshi Kasei K.K., solid content: 50% by weight, pH 7.0;
Polybutene emulsion 1: EMAWET 10E, manufactured by NOF Corporation, solid content: 53% by weight, pH 7.0;
Polybutene emulsion 2: EMAWET 30E, manufactured by NOF Corporation, solid content: 53% by weight, pH 7.0;
Natural rubber latex: HA, manufactured by Golden Hope Plantation Berhad Co., Ltd., solid content: 60% by weight, pH 11.5;
Tackifier: HARIESTER SK508, manufactured by Harima Chemicals, Inc., solid content: 54% by weight, pH 6.5;
Antifreezing agent (ethylene glycol): manufactured by Wako Pure Chemical Industries, Ltd., solid content: 100% by weight;
Hydrochloric acid: manufactured by Wako Pure Chemical Industries, Ltd.;
Triethylamine: manufactured by Wako Pure Chemical Industries, Ltd.

As is evident from the results shown in Table 5, the natural rubber latex tire puncture sealant (Comparative Example 3-1) had a high pH value and caused rust and pungent odor, while showing low storage stability. In addition, the NBR tire puncture sealant (Comparative Example 3-2) had a high pH value and caused rust and pungent odor, while having low liquid supply properties and air supply properties.

In contrast, Examples 3-1 to 3-32 showed sealing properties equivalent to those in Comparative Examples 3-1 and 3-2, together with excellent storage stability, liquid supply properties and air supply properties. Further, there was no rust or odor.

4. Examples of the Tire Puncture Sealant in the Fourth Aspect of the Present Invention

Preparation of Urethane Emulsion

Synthetic Examples 4-1 and 4-2

Synthetic Example 4-1

A carboxy group-containing urethane polymer was synthesized by mixing 62 g of tolylene diisocyanate (Cosmonate T-80, manufactured by Mitsui Takeda Chemicals, Inc.), 251 g of polycarbonate diol (PLACCEL CD220, manufactured by Daicel Chemical Industries, Ltd., with an Mn of 2,000), 10.5 g of dimethylol butanoic acid (Nikkamer BA, manufactured by Nippon Kasei Chemical Co., Ltd.), and 400 g of ethyl acetate (manufactured by Wako Pure Chemical Industries, Ltd.).

Next, 7.7 g of triethylamine (manufactured by Wako Pure Chemical Industries, Ltd.), 4.0 g of piperazine hexahydrate (manufactured by Nippon Nyukazai Co., Ltd.), and 400 g of distilled water were added. The mixture was then emulsified with sufficient stirring to obtain urethane emulsion 1 (solid content: 45.6% by weight, pH 7.5).

Synthetic Example 4-2

A tertiary amino group-containing urethane prepolymer (NCO%=4.6%) was synthesized by mixing 12.4 g of tolylene diisocyanate (manufactured by Mitsui Takeda Chemicals, Inc.), 57.0 g of 3-methylpentanediol adipate (Kuraray Polyol P2010, manufactured by Kuraray Co., Ltd.), and 2.1 g of N-methyl diethanolamine (manufactured by Wako Pure Chemical Industries, Ltd.).

Next, to the urethane prepolymer thus obtained were added 1.8 g of hydrochloric acid (manufactured by Wako Pure Chemical Industries, Ltd.), 15.0 g of terpene tackifier (YS Resin TO115, manufactured by Yasuhara Chemical Co., Ltd.), 2.8 g of piperazine hexahydrate (manufactured by Nippon Nyukazai Co., Ltd.), 136.7 g of distilled water, and 150 g of ethylene glycol (manufactured by Wako Pure Chemical Industries, Ltd.). The mixture was then emulsified with sufficient stirring to obtain a urethane emulsion (pH 4.5). To the urethane emulsion was added 0.8 g of triethylamine (manufactured by Wako Pure Chemical Industries, Ltd.) to adjust its pH to 5.5, thereby obtaining urethane emulsion 2 (solid content: 40.0% by weight, pH 5.5).

Preparation of NBR Latex Tire Puncture Sealant

Formulation Example 4-1

An NBR latex tire puncture sealant was prepared according to the method of Example 1 described in JP 2005-170973 A.

Specifically, materials (1) to (5) described below:
(1) Rubber latex: NBR latex (Nipol, manufactured by Zeon Corporation), content in the puncture sealant: 65% by weight;
(2) Nylon fiber: content in the puncture sealant: 2% by weight, fiber length: 2 to 7 mm, fiber thickness: 5 to 30 μm;
(3) Antifreezing agent: ethylene glycol, content in the puncture sealant: 25% by weight;
(4) Thickener: smectite clay, content in the puncture sealant: 2% by weight; and
(5) Others: water as the balance were mixed using a stirring device to obtain an NBR latex tire puncture sealant of Formulation Example 4-1 (pH 9.5).

Examples 4-1 to 4-52 and Comparative Examples 4-1 to 4-4

The respective components listed in Table 6 below were mixed in compositions (parts by weight) shown in Table 6 with a stirring device, thereby preparing the respective tire puncture sealants shown in Table 6.

The hydrogen ion exponent of each of the tire puncture sealants thus obtained was measured with a pH meter. Each tire puncture sealant was evaluated in the same manner as above for the rustproof properties, odor, freezing point, sealing properties, thermal shock cycle stability, shaking test, storage stability, liquid supply properties, and air supply properties.

The results are shown in Table 6.

TABLE 6

| | Example | | | | | | | | | | | | Comparative Example | |
|---|---|---|---|---|---|---|---|---|---|---|---|---|---|---|
| | 4-1 | 4-2 | 4-3 | 4-4 | 4-5 | 4-6 | 4-7 | 4-8 | 4-9 | 4-10 | 4-11 | 4-12 | 4-1 | 4-2 |
| EVA emulsion 1 | 100 | 100 | 100 | 100 | | | | | 100 | 100 | | | | |
| EVA emulsion 2 | | | | | 100 | 100 | 100 | 100 | | | 100 | 100 | | |

TABLE 6-continued

| | | | | | | | | | | | | | | |
|---|---|---|---|---|---|---|---|---|---|---|---|---|---|---|
| Natural rubber latex | | | | | | | | | | | | | 100 | |
| Formulation Example 4-1 (NBR tire puncture sealant) | | | | | | | | | | | | | | 100 |
| Tackifier 1 | 100 | 100 | 100 | 150 | 150 | 150 | 150 | 150 | 80 | 80 | 80 | 80 | 80 | | |
| Antifreezing agent | 100 | 150 | 70 | 70 | 100 | 150 | 70 | 70 | 50 | 200 | 50 | 200 | 70 | | |
| pH | 7.0 | 7.0 | 7.0 | 7.0 | 7.0 | 7.0 | 7.0 | 7.0 | 7.0 | 7.0 | 7.0 | 7.0 | 9.0 | | 9.5 |
| Rustproof properties | Good | Good | Good | Good | Good | Good | Good | Good | Good | Good | Good | Good | Poor | | Poor |
| Odor | Good | Good | Good | Good | Good | Good | Good | Good | Good | Good | Good | Good | Poor | | Poor |
| Freezing point (° C.) | −38 | −37 | −38 | −40 | −42 | −40 | −40 | −40 | −11 | −40 | −11 | −42 | −38 | | −40 |
| Sealing properties | Good | Good | Good | Good | Good | Good | Good | Good | Good | Good | Good | Good | Good | | Good |
| Thermal shock cycle stability | Good | Good | Good | Good | Good | Good | Good | Good | Fair | Good | Fair | Good | Good | | Fair |
| Shaking test (70° C.) | Good | Good | Good | Good | Good | Good | Good | Good | Good | Fair | Good | Fair | Fair | | Good |
| Storage stability (80° C. × 100 days) | Good | Good | Good | Good | Good | Good | Good | Good | Good | Good | Good | Good | Fair | | Good |
| Liquid supply properties (s) | 35 | 40 | 50 | 45 | 35 | 45 | 45 | 50 | 50 | 35 | 45 | 40 | 30 | | 300 |
| Air supply properties (s) | 210 | 200 | 225 | 190 | 190 | 180 | 210 | 230 | 240 | 215 | 240 | 235 | 220 | | >300 |

| | Example | | | | | | | | | | | | Comparative Example |
|---|---|---|---|---|---|---|---|---|---|---|---|---|---|
| | 4-13 | 4-14 | 4-15 | 4-16 | 4-17 | 4-18 | 4-19 | 4-20 | 4-21 | 4-22 | 4-23 | 4-24 | 4-3 |
| EVA emulsion 1 | 100 | 100 | 100 | 100 | | | | | 100 | 100 | | | |
| EVA emulsion 2 | | | | | 100 | 100 | 100 | 100 | | | 100 | 100 | |
| Natural rubber latex | | | | | | | | | | | | | 100 |
| Tackifier 2 | 100 | 100 | 100 | 150 | 150 | 150 | 150 | 150 | 80 | 80 | 80 | 80 | 80 |
| Antifreezing agent | 100 | 150 | 70 | 70 | 100 | 150 | 70 | 70 | 50 | 200 | 50 | 200 | 70 |
| pH | 7.0 | 7.0 | 7.0 | 7.0 | 7.0 | 7.0 | 7.0 | 7.0 | 7.0 | 7.0 | 7.0 | 7.0 | 10.0 |
| Rustproof properties | Good | Good | Good | Good | Good | Good | Good | Good | Good | Good | Good | Good | Poor |
| Odor | Good | Good | Good | Good | Good | Good | Good | Good | Good | Good | Good | Good | Poor |
| Freezing point (° C.) | −38 | −37 | −38 | −27 | −41 | −41 | −39 | −38 | −13 | −41 | −14 | −39 | −42 |
| Sealing properties | Good | Good | Good | Good | Good | Good | Good | Good | Good | Good | Good | Good | Good |
| Thermal shock cycle stability | Good | Good | Good | Good | Good | Good | Good | Good | Fair | Good | Fair | Good | Good |
| Shaking test (70° C.) | Good | Good | Good | Good | Good | Good | Good | Good | Good | Fair | Good | Fair | Fair |
| Storage stability (80° C. × 100 days) | Good | Good | Good | Good | Good | Good | Good | Good | Good | Good | Good | Good | Fair |
| Liquid supply properties (s) | 40 | 45 | 35 | 30 | 45 | 50 | 35 | 55 | 40 | 45 | 45 | 45 | 35 |
| Air supply properties (s) | 225 | 215 | 230 | 245 | 215 | 215 | 215 | 220 | 200 | 210 | 245 | 210 | 210 |

| | Example | | | | | | | | | | | | | | Comparative Example |
|---|---|---|---|---|---|---|---|---|---|---|---|---|---|---|---|
| | 4-25 | 4-26 | 4-27 | 4-28 | 4-29 | 4-30 | 4-31 | 4-32 | 4-33 | 4-34 | 4-35 | 4-36 | 4-37 | 4-38 | 4-4 |
| EVA emulsion 1 | 100 | 100 | 100 | 100 | | | | | 100 | 100 | | | 100 | 100 | |
| EVA emulsion 2 | | | | | 100 | 100 | 100 | 100 | | | 100 | 100 | | | |
| Natural rubber latex | | | | | | | | | | | | | | | 100 |
| Tackifier 3 | 100 | 100 | 100 | 150 | 150 | 150 | 150 | 150 | 80 | 80 | 80 | 80 | 100 | 100 | 80 |
| Antifreezing agent | 100 | 150 | 70 | 70 | 100 | 150 | 70 | 70 | 50 | 200 | 50 | 200 | 100 | 100 | 70 |
| Hydrochloric acid | | | | | | | | | | | | | 1.6 | | |
| Triethylamine | | | | | | | | | | | | | | 2.1 | |
| pH | 7.0 | 7.0 | 7.0 | 7.0 | 7.0 | 7.0 | 7.0 | 7.0 | 7.0 | 7.0 | 7.0 | 7.0 | 5.5 | 8.5 | 10.0 |
| Rustproof properties | Good | Good | Good | Good | Good | Good | Good | Good | Good | Good | Good | Good | Good | Good | Poor |
| Odor | Good | Good | Good | Good | Good | Good | Good | Good | Good | Good | Good | Good | Good | Good | Poor |
| Freezing point (° C.) | −38 | −37 | −38 | −40 | −41 | −41 | −40 | −40 | −12.5 | −40 | −11 | −42 | −40 | −36 | −42 |

TABLE 6-continued

| | | | | | | | | | | | | | | | |
|---|---|---|---|---|---|---|---|---|---|---|---|---|---|---|---|
| Sealing properties | Good | Good | Good | Good | Good | Good | Good | Good | Good | Good | Good | Good | Good | Good | Good |
| Thermal shock cycle stability | Good | Good | Good | Good | Good | Good | Good | Good | Fair | Good | Fair | Good | Good | Good | Good |
| Shaking test (70° C.) | Good | Good | Good | Good | Good | Good | Good | Good | Good | Fair | Good | Fair | Good | Good | Fair |
| Storage stability (80° C. × 100 days) | Good | Good | Good | Good | Good | Good | Good | Good | Good | Good | Good | Good | Good | Good | Fair |
| Liquid supply properties (s) | 40 | 55 | 45 | 35 | 35 | 35 | 45 | 35 | 50 | 40 | 50 | 45 | 50 | 45 | 40 |
| Air supply properties (s) | 210 | 235 | 220 | 245 | 210 | 195 | 210 | 195 | 240 | 240 | 240 | 240 | 220 | 200 | 210 |

| | Example | | | | | | | |
|---|---|---|---|---|---|---|---|---|
| | 4-39 | 4-40 | 4-41 | 4-42 | 4-43 | 4-44 | 4-45 | 4-46 |
| EVA emulsion 1 | 100 | 100 | 100 | 100 | | | | |
| EVA emulsion 2 | | | | | 100 | 100 | 100 | 100 |
| Tackifier 3 | 20 | 100 | 150 | 200 | 20 | 100 | 150 | 200 |
| Antifreezing agent | 70 | 70 | 70 | 70 | 70 | 70 | 70 | 70 |
| pH | 7.0 | 7.0 | 7.0 | 7.0 | 7.0 | 7.0 | 7.0 | 7.0 |
| Rustproof properties | Good | Good | Good | Good | Good | Good | Good | Good |
| Odor | Good | Good | Good | Good | Good | Good | Good | Good |
| Freezing point (° C.) | −38 | −37 | −38 | −37 | −38 | −37 | −36 | −35 |
| Sealing properties | Good | Good | Good | Good | Good | Good | Good | Good |
| Thermal shock cycle stability | Good | Good | Good | Good | Good | Good | Good | Good |
| Shaking test (70° C.) | Good | Good | Good | Good | Good | Good | Good | Good |
| Storage stability (80° C. × 100 days) | Good | Good | Good | Good | Good | Good | Good | Good |
| Liquid supply properties (s) | 50 | 35 | 35 | 35 | 45 | 40 | 40 | 30 |
| Air supply properties (s) | 200 | 190 | 190 | 210 | 220 | 220 | 195 | 210 |

| | Example | | | | | |
|---|---|---|---|---|---|---|
| | 4-47 | 4-48 | 4-49 | 4-50 | 4-51 | 4-52 |
| Acrylic emulsion | 100 | | | | | |
| Polybutene emulsion | | 100 | | | | |
| Polyethylene emulsion | | | 100 | | | |
| Polypropylene emulsion | | | | 100 | | |
| Urethane emulsion 1 | | | | | 100 | |
| Urethane emulsion 2 | | | | | | 100 |
| Tackifier 1 | 100 | 150 | 140 | 140 | 150 | 150 |
| Antifreezing agent | 150 | 70 | 100 | 70 | 70 | 100 |
| pH | 7.5 | 7.0 | 6.8 | 7.0 | 8.0 | 5.5 |
| Rustproof properties | Good | Good | Good | Good | Good | Good |
| Odor | Good | Good | Good | Good | Good | Good |
| Freezing point (° C.) | −37 | −39 | −39 | −39 | −41 | −40 |
| Sealing properties | Good | Good | Good | Good | Good | Good |
| Thermal shock cycle stability | Good | Good | Good | Good | Good | Good |
| Shaking test (70° C.) | Good | Good | Good | Good | Good | Good |
| Storage stability (80° C. × 100 days) | Good | Good | Good | Good | Good | Good |
| Liquid supply properties (s) | 40 | 35 | 40 | 30 | 45 | 35 |
| Air supply properties (s) | 240 | 215 | 215 | 195 | 240 | 190 |

The respective components listed in Table 6 are as follows:

EVA Emulsion 1: Sumikaflex 510 HQ, manufactured by Sumika Chemtex Co., Ltd., solid content: 55% by weight, pH 7.0;

EVA Emulsion 2: Sumicaflex 1010, manufactured by Sumika Chemtex Co., Ltd., solid content: 50% by weight, pH 7.0;

Natural rubber latex: HA, manufactured by Golden Hope Plantation Berhad Co., Ltd., solid content: 60% by weight, pH 11.5;

Antifreezing agent (ethylene glycol): manufactured by Wako Pure Chemical Industries, Ltd., solid content: 100% by weight;

Tackifier 1: HARIESTER SK508, manufactured by Harima Chemicals, Inc., solid content: 54% by weight, pH 6.5;

Tackifier 2: HARIESTER SK70D, manufactured by Harima Chemicals, Inc., solid content: 50% by weight, pH 6.5;

Tackifier 3: Nanolet R1050, manufactured by Yasuhara Chemical Co., Ltd., solid content: 50% by weight, pH 6.5;

Acrylic emulsion: Acronal A378, manufactured by BASF Japan, Ltd., solid content: 50% by weight, pH 8.0;

Polybutene emulsion: EMAWET 200E, manufactured by NOF Corporation, solid content: 53% by weight, pH 7.0;

Polyethylene emulsion: PE401, manufactured by Naruse Chemical Co., Ltd., solid content: 60% by weight, pH 7.0;

Polypropylene emulsion: PP emulsion, manufactured by Maruyoshi Kasei K.K., solid content: 50% by weight, pH 7.0;

Urethane emulsion 1: Urethane emulsion of Synthetic Example 4-1;

Urethane emulsion 2: Urethane emulsion of Synthetic Example 4-2;

As is evident from the results shown in Table 6, the natural rubber latex tire puncture sealants (Comparative Examples 4-1, 4-3, and 4-4) each had a high pH value and caused rust and pungent odor, while having low storage stability. In addition, the NBR tire puncture sealant (Comparative Example 4-2) had a high pH value and caused rust and pungent odor, while having low liquid supply properties and air supply properties.

In contrast, Examples 4-1 to 4-52 showed sealing properties equivalent to those in Comparative Examples 4-1 to 4-4, together with excellent storage stability, liquid supply properties, and air supply properties. Further, there was no rust or odor.

5. Examples of the Tire Puncture Sealant in the Fifth Aspect of the Present Invention Preparation of Chloroprene Emulsion Formulation Examples 5-1 to 5-6

A chloroprene emulsion (C-84, manufactured by Sumika Bayer Urethane Co., Ltd.) and hydrochloric acid (manufactured by Wako Pure Chemical Industries, Ltd.) were mixed in amounts (parts by weight) shown in Table 7 to obtain each of chloroprene emulsions in Formulation Examples 5-1 to 5-6.

The hydrogen ion exponent of each of the resulting chloroprene emulsions was measured with a pH meter. The results are shown in Table 7.

(5) Others: water as the balance were mixed using a stirring device to obtain an NBR latex tire puncture sealant of Formulation Example 5-7 (pH 9.5).

TABLE 7

|  | Formulation Example 5-1 | Formulation Example 5-2 | Formulation Example 5-3 | Formulation Example 5-4 | Formulation Example 5-5 | Formulation Example 5-6 |
| --- | --- | --- | --- | --- | --- | --- |
| Chloroprene emulsion | 100 | 100 | 100 | 100 | 100 | 100 |
| Hydrochloric acid |  | 0.05 | 0.08 | 0.1 | 0.2 | 0.3 |
| Hydrogen ion exponent (pH) | 11.5 | 9.3 | 9.0 | 8.6 | 7.2 | 6.2 |
| Solid content (wt %) | 55 | 55 | 55 | 55 | 55 | 55 |

Preparation of NBR Latex Tire Puncture Sealant

Formulation Example 5-7

An NBR latex tire puncture sealant was prepared according to the method of Example 1 described in JP 2005-170973 A.

Specifically, materials (1) to (5) described below:

(1) Rubber latex: NBR latex (Nipol, manufactured by Zeon Corporation), content in the puncture sealant: 65% by weight;

(2) Nylon fiber: content in the puncture sealant: 2% by weight, fiber length: 2 to 7 mm, fiber thickness: 5 to 30 μm;

(3) Antifreezing agent: ethylene glycol, content in the puncture sealant: 25% by weight;

(4) Thickener: smectite clay, content in the puncture sealant: 2% by weight; and Hydrochloric acid: manufactured by Wako Pure Chemical Industries, Ltd.;

Triethylamine: manufactured by Wako Pure Chemical Industries, Ltd.

Examples 5-1 to 5-17 and Comparative Examples 5-1 to 5-3

The respective components listed in Table 8 below were mixed in compositions (parts by weight) shown in Table 8 with a stirring device, thereby preparing the respective tire puncture sealants shown in Table 8.

The hydrogen ion exponent of each of the tire puncture sealants thus obtained was measured with a pH meter. Each tire puncture sealant was evaluated in the same manner as above for the freezing point, sealing properties, thermal shock cycle stability, shaking test, storage stability, and liquid supply properties. Rustproof properties and odor were also evaluated by the methods described below.

The results are shown in Table 8.

(Rustproof Properties)

Each tire puncture sealant was applied onto the surface of a steel plate having been degreased with methyl ethyl ketone, and then left standing for 24 hours at 20° C. to be dried. Subsequently, the steel plate was immersed in hot water at 50°

C. and left standing for 7 days. After that, the sealant was peeled off of the steel plate and the surface of the steel plate was visually observed to check whether or not the plate surface was rusted.

A steel plate which was not rusted or was unnoticeably rusted was rated as "good", whereas a steel plate which was noticeably rusted was rated as "poor".

(Odor)

Whether or not each tire puncture sealant had odor was checked.

A sealant having no odor was rated as "good", a sealant having a slight odor as "fair" and a sealant having a strong odor as "poor".

As is evident from the results shown in Table 8, Comparative Example 5-1 with a high pH value of 11.0 was excellent in stability but caused rust and pungent odor, while showing low sealing properties. In addition, the natural rubber latex tire puncture sealant (Comparative Example 5-2) had a high pH value and caused rust and pungent odor, while showing low storage stability. Further, the NBR latex tire puncture sealant (Comparative Example 5-3) had a high pH value and caused rust and pungent odor, while showing low liquid supply properties.

On the other hand, Examples 5-1 to 5-17 showed sealing properties equivalent to those in Comparative Examples 5-2 and 5-3. Examples 5-1 to 5-3 and 5-6 to 5-17 had a slight ammonia odor although the degree of odor emanated was low.

TABLE 8

|  | Comparative Example 5-1 | Example 5-1 | Example 5-2 | Example 5-3 | Example 5-4 | Example 5-5 |
|---|---|---|---|---|---|---|
| Formulation Example 5-1 (pH 11.5) | 100 | | | | | |
| Formulation Example 5-2 (pH 9.3) | | 100 | | | | |
| Formulation Example 5-3 (pH 9.0) | | | 100 | | | |
| Formulation Example 5-4 (pH 8.6) | | | | 100 | | |
| Formulation Example 5-5 (pH 7.2) | | | | | 100 | |
| Formulation Example 5-6 (pH 6.2) | | | | | | 100 |
| Tackifier | 100 | 100 | 100 | 100 | 100 | 100 |
| Antifreezing agent | 100 | 100 | 100 | 100 | 100 | 100 |
| pH | 11.0 | 8.7 | 8.5 | 8.1 | 7.3 | 7.0 |
| Rustproof properties | Poor | Good | Good | Good | Good | Good |
| Odor | Poor | Fair | Fair | Fair | Good | Good |
| Freezing point (° C.) | −39 | −41 | −40 | −39 | −39 | −40 |
| Sealing properties | Poor | Good | Good | Good | Good | Good |
| Thermal shock cycle stability | Good | Good | Good | Good | Fair | Fair |
| Shaking test (70° C.) | Good | Good | Good | Good | Fair | Fair |
| Storage stability (80° C. × 100 days) | Good | Good | Good | Good | Fair | Fair |
| Liquid supply properties (s) | 40 | 35 | 30 | 35 | 35 | 35 |

|  | Example | | | | | | | | | | | | Comparative Example | |
|---|---|---|---|---|---|---|---|---|---|---|---|---|---|---|
|  | 5-6 | 5-7 | 5-8 | 5-9 | 5-10 | 5-11 | 5-12 | 5-13 | 5-14 | 5-15 | 5-16 | 5-17 | 5-2 | 5-3 |
| Formulation Example 5-2 (pH 9.3) | 100 | 100 | 100 | 100 | | | | | 100 | 100 | | | | |
| Formulation Example 5-3 (pH 9.0) | | | | | 100 | 100 | 100 | 100 | | | 100 | 100 | | |
| Natural rubber latex | | | | | | | | | | | | | 100 | |
| Formulation Example 5-7 (NBR tire puncture sealant) | | | | | | | | | | | | | | 100 |
| Tackifier | 100 | 100 | 100 | 150 | 100 | 100 | 100 | 150 | 80 | 80 | 80 | 80 | 80 | |
| Antifreezing agent | 100 | 150 | 70 | 70 | 100 | 150 | 70 | 70 | 50 | 200 | 50 | 200 | 70 | |
| pH | 8.7 | 8.5 | 8.5 | 8.5 | 8.1 | 8.0 | 8.2 | 7.8 | 8.6 | 8.5 | 8.1 | 7.8 | 9.0 | 9.5 |
| Rustproof properties | Good | Good | Good | Good | Good | Good | Good | Good | Good | Good | Good | Good | Poor | Poor |
| Odor | Fair | Fair | Fair | Fair | Fair | Fair | Fair | Fair | Fair | Fair | Fair | Fair | Poor | Poor |
| Freezing point (° C.) | −39 | −41 | −38 | −39 | −38 | −39 | −39 | −40 | −11 | −42 | −9.5 | −40 | −38 | −40 |
| Sealing properties | Good | Good | Good | Good | Good | Good | Good | Good | Good | Good | Good | Good | Good | Good |
| Thermal shock cycle stability | Good | Good | Good | Good | Good | Good | Good | Good | Fair | Good | Fair | Good | Good | Fair |
| Shaking test (70° C.) | Good | Good | Good | Good | Good | Good | Good | Good | Fair | Good | Fair | Good | Fair | Good |
| Storage stability (80° C. × 100 days) | Good | Good | Good | Good | Good | Good | Good | Good | Good | Good | Good | Good | Fair | Good |
| Liquid supply properties (s) | 30 | — | — | — | 35 | — | — | — | 30 | — | — | 30 | 30 | 300 |

The respective components listed in Table 8 are as follows:

Natural rubber latex: HA, manufactured by Golden Hope Plantation Berhad Co., Ltd., solid content: 60% by weight, pH 11.5;

Tackifier: HARIESTER SK508, manufactured by Harima Chemicals, Inc., solid content: 54% by weight, pH 6.5;

Antifreezing agent (ethylene glycol): manufactured by Wako Pure Chemical Industries, Ltd., solid content: 100% by weight.

Examples 5-1 to 5-6, 5-10, 5-14, and 5-17 had excellent liquid supply properties. Examples 5-1 to 5-17 caused no or almost no rust. Moreover, Examples 5-1 to 5-3 and 5-6 to 5-17 were excellent in storage stability.

What is claimed is:

1. A tire puncture sealant comprising a polyolefin emulsion which is an emulsion in water of a polyolefin having hydrophilic group introduced therein and an antifreezing agent, wherein the tire puncture sealant has a hydrogen ion exponent of 5.5 to 8.5 and does not have a rubber latex.

2. The tire puncture sealant according to claim 1, wherein the polyolefin emulsion is at least one emulsion selected from the group consisting of polyethylene emulsion, polypropylene emulsion, ethylene-propylene copolymer emulsion, and polybutene emulsion.

3. The tire puncture sealant according to claim 1, wherein a content of the antifreezing agent is 90 to 500 parts by weight with respect to 100 parts by weight of a solid content of the polyolefin emulsion.

4. The tire puncture sealant according to claim 1, further comprising a tackifier.

5. The tire puncture sealant according to claim 4, wherein the tackifier is in the form of an emulsion obtained by emulsifying a resin.

6. The tire puncture sealant according to claim 4, wherein the tackifier contains at least one selected from the group consisting of a rosin resin, a terpene resin, and a hydrogenated terpene resin.

7. The tire puncture sealant according to claim 4, wherein a solid content of the tackifier is 50 to 250 parts by weight with respect to 100 parts by weight of the solid content of the polyolefin emulsion.

* * * * *